(12) United States Patent
Tsukagoshi

(10) Patent No.: US 10,397,642 B2
(45) Date of Patent: Aug. 27, 2019

(54) TRANSMISSION DEVICE, TRANSMISSION METHOD, AND RECEPTION DEVICE

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/323,773

(22) PCT Filed: Jul. 9, 2015

(86) PCT No.: PCT/JP2015/069793
§ 371 (c)(1),
(2) Date: Jan. 4, 2017

(87) PCT Pub. No.: WO2016/021365
PCT Pub. Date: Feb. 11, 2016

(65) Prior Publication Data
US 2017/0164033 A1   Jun. 8, 2017

(30) Foreign Application Priority Data

Aug. 7, 2014   (JP) .................................. 2014-161833

(51) Int. Cl.
*H04N 7/16* (2011.01)
*H04N 21/436* (2011.01)
(Continued)

(52) U.S. Cl.
CPC ............. *H04N 21/436* (2013.01); *G06T 9/00* (2013.01); *H04N 19/102* (2014.11);
(Continued)

(58) Field of Classification Search
CPC ..................... H04N 21/436; H04N 21/2351
(Continued)

(56) References Cited

U.S. PATENT DOCUMENTS 5,144,425 A * 9/1992 Joseph ................. H04N 19/149
348/E7.004
6,263,022 B1 * 7/2001 Chen .................... H04N 19/126
375/240.03
(Continued)

FOREIGN PATENT DOCUMENTS

| JP | 2008-543142 A | 11/2008 |
| WO | 2013/151814 A1 | 10/2013 |
| WO | WO 2014/034463 A1 | 3/2014 |

OTHER PUBLICATIONS

International Search Report dated Sep. 29, 2015 in PCT/JP2015/069793 filed Jul. 9, 2015.
(Continued)

*Primary Examiner* — Michael B. Pierorazio
(74) *Attorney, Agent, or Firm* — Oblon, McClelland, Maier & Neustadt, L.L.P.

(57) ABSTRACT

A predetermined number of pieces of high-quality format image data are successfully transmitted together with basic format image data. A basic video stream including encoded image data of basic format image data and an extended video stream including encoded image data of each of a predetermined number of pieces of high-quality format image data are generated, or a video stream including encoded image data of basic format image data and encoded image data of each of a predetermined number of pieces of high-quality format image data is generated. A container of a predetermined format including the generated video stream is transmitted. Identification information identifying a corresponding format is inserted into the encoded image data of the basic format image data and each of a predetermined number of pieces of high-quality format image data.

19 Claims, 19 Drawing Sheets

(51) Int. Cl.

| | |
|---|---|
| H04N 21/236 | (2011.01) |
| H04N 21/2662 | (2011.01) |
| H04N 21/438 | (2011.01) |
| H04N 21/4545 | (2011.01) |
| H04N 19/70 | (2014.01) |
| H04N 19/30 | (2014.01) |
| H04N 19/102 | (2014.01) |
| H04N 19/134 | (2014.01) |
| H04N 19/189 | (2014.01) |
| G06T 9/00 | (2006.01) |
| H04N 21/235 | (2011.01) |
| H04N 21/6336 | (2011.01) |

(52) U.S. Cl.
CPC ......... *H04N 19/134* (2014.11); *H04N 19/189* (2014.11); *H04N 19/30* (2014.11); *H04N 19/70* (2014.11); *H04N 21/236* (2013.01); *H04N 21/2351* (2013.01); *H04N 21/2662* (2013.01); *H04N 21/438* (2013.01); *H04N 21/4545* (2013.01); *H04N 21/6336* (2013.01)

(58) Field of Classification Search
USPC ......................................................... 725/136
See application file for complete search history.

(56) References Cited

U.S. PATENT DOCUMENTS

| | | | | |
|---|---|---|---|---|
| 6,490,705 | B1* | 12/2002 | Boyce | H04N 19/66 375/E7.088 |
| 6,496,217 | B1* | 12/2002 | Piotrowski | H04N 21/234318 348/14.08 |
| 6,501,797 | B1* | 12/2002 | van der Schaar | H04N 19/37 375/240.08 |
| 6,674,477 | B1* | 1/2004 | Yamaguchi | H04L 1/1854 348/387.1 |
| 7,095,782 | B1* | 8/2006 | Cohen | H04N 21/234327 348/410.1 |
| 7,958,532 | B2* | 6/2011 | Paul | H04N 21/234327 348/14.12 |
| 8,064,389 | B2* | 11/2011 | Khan | H04B 7/022 370/329 |
| 8,072,943 | B2* | 12/2011 | Khan | H04B 7/022 370/335 |
| 8,284,845 | B1* | 10/2012 | Kovacevic | H04N 21/4305 370/389 |
| 8,467,656 | B2* | 6/2013 | Kamio | G11B 27/034 386/200 |
| 8,904,445 | B2* | 12/2014 | Britt | H04N 5/782 725/46 |
| 2004/0208239 | A1* | 10/2004 | Karlsson | H04K 3/82 375/219 |
| 2007/0179948 | A1* | 8/2007 | Jennings, III | H04L 67/104 |
| 2008/0062168 | A1* | 3/2008 | Poullier | H04N 1/00132 345/419 |
| 2008/0170630 | A1* | 7/2008 | Falik | H04L 47/2416 375/240.29 |
| 2009/0034629 | A1* | 2/2009 | Suh | H04H 20/30 375/240.27 |
| 2009/0187960 | A1* | 7/2009 | Lee | H04N 7/17318 725/131 |
| 2009/0222855 | A1* | 9/2009 | Vare | H04H 20/28 725/39 |
| 2009/0268806 | A1* | 10/2009 | Kim | H04N 21/234327 375/240.01 |
| 2010/0260254 | A1* | 10/2010 | Kimmich | H04N 21/631 375/240.01 |
| 2010/0260268 | A1* | 10/2010 | Cowan | H04N 13/0048 375/240.25 |
| 2011/0002397 | A1* | 1/2011 | Wang | H04N 19/70 375/240.26 |
| 2011/0096828 | A1* | 4/2011 | Chen | H04N 21/23106 375/240.02 |
| 2011/0164683 | A1* | 7/2011 | Takahashi | H04N 19/70 375/240.16 |
| 2011/0187503 | A1* | 8/2011 | Costa | H05K 7/1498 340/8.1 |
| 2011/0239078 | A1* | 9/2011 | Luby | H04N 21/23106 714/752 |
| 2011/0289542 | A1* | 11/2011 | Kitazato | H04N 21/2625 725/115 |
| 2012/0185907 | A1* | 7/2012 | Park | H04N 21/236 725/110 |
| 2012/0224651 | A1* | 9/2012 | Murakami | H04L 25/03171 375/295 |
| 2012/0250619 | A1* | 10/2012 | Twitchell, Jr. | H04W 40/12 370/328 |
| 2012/0320168 | A1* | 12/2012 | Yun | H04N 21/234327 348/51 |
| 2013/0136193 | A1* | 5/2013 | Hwang | H03M 13/05 375/240.27 |
| 2013/0266077 | A1 | 10/2013 | Boyce et al. | |
| 2013/0305304 | A1* | 11/2013 | Hwang | H04N 21/2381 725/109 |
| 2014/0050458 | A1* | 2/2014 | Mochinaga | H04N 5/76 386/239 |
| 2014/0098289 | A1* | 4/2014 | Jang | G11B 27/105 348/441 |
| 2014/0115472 | A1* | 4/2014 | Mochinaga | H04N 13/0048 715/719 |
| 2014/0119712 | A1* | 5/2014 | Jang | H04N 9/80 386/248 |
| 2014/0204177 | A1* | 7/2014 | Hattori | G11B 27/105 348/43 |
| 2014/0211861 | A1* | 7/2014 | Lee | H04N 19/89 375/240.27 |
| 2015/0095965 | A1* | 4/2015 | Yang | H04L 1/0057 725/116 |

OTHER PUBLICATIONS

Miska M. Hannuksela et al., "Draft Text for Scalable Extensions of High Efficiency Video Coding (HEVC)", Joint Collaborative Team on Video Coding (JCT-VC) of ITU-T SG16 WP3 and ISO/IEC JTC1/SC29/WG11, Oct. 10-19, 2012, 2 pages.

Sam Narasimhan et al., "Extensions to support layer addition and removal, access unit structure and changes to HRD model in scalable HEVC", Joint Collaborative Team on Video Coding (JCT-VC) of ITU-T SG 16 WP 3 and ISO/IEC JTC 1/SC 29/WG 11, Jul. 29-Aug. 2, 2013, 3 pages.

Extended European Search Report dated Nov. 8, 2017 in Patent Application No. 15830176.2.

"Draft new ITU-T Recommendation H.265 attachment 2 (Attachment 2 to TD 294/PLEN); TD" International Telecommunication Union, ITU-T Draft, vol. plen/16, XP044081435, Jul. 2014, 183 pages.

Office Action dated Feb. 26, 2019 in Japanese Application No. 2016-540130.

Communication dated Oct. 25, 2018 in European Patent Application No. 15 830 176.2.

T13-SG16-140630-TD-WP3-0147!A2!MSW-E;TD147/WP3, ITU-T Draft; Study Period 2013-2016, International Telecommunication Union, Geneva; CH, Jul. 10, 2014 (Jul. 10, 2014), pp. 1-183, XP017590740.

\* cited by examiner

NAL unit header syntax

| Syntax | No. of Bits | Format |
|---|---|---|
| nal_unit_header() { | | |
|   forbiddden_zero_bit | 1 | bslbf |
|   nal_unit_type | 6 | uimsbf |
|   nuh_layer_id | 6 | bslbf |
|   nuh_temporal_id_plus1 | 3 | uimsbf |
| } | | |

(b)

Semantics forbidden_zero_bit     (1bit)     0 IS MANDATORY.
nal_unit_type     (6bits) INDICATE TYPE OF NALunit.
nuh_layer_id     (6bits) ID INDICATING LAYER EXTENSION TYPE OF STREAM.
nuh_temporal_id_plus1 (3bits) INDICATE VALUE (0 TO 6) OF temporal_id.

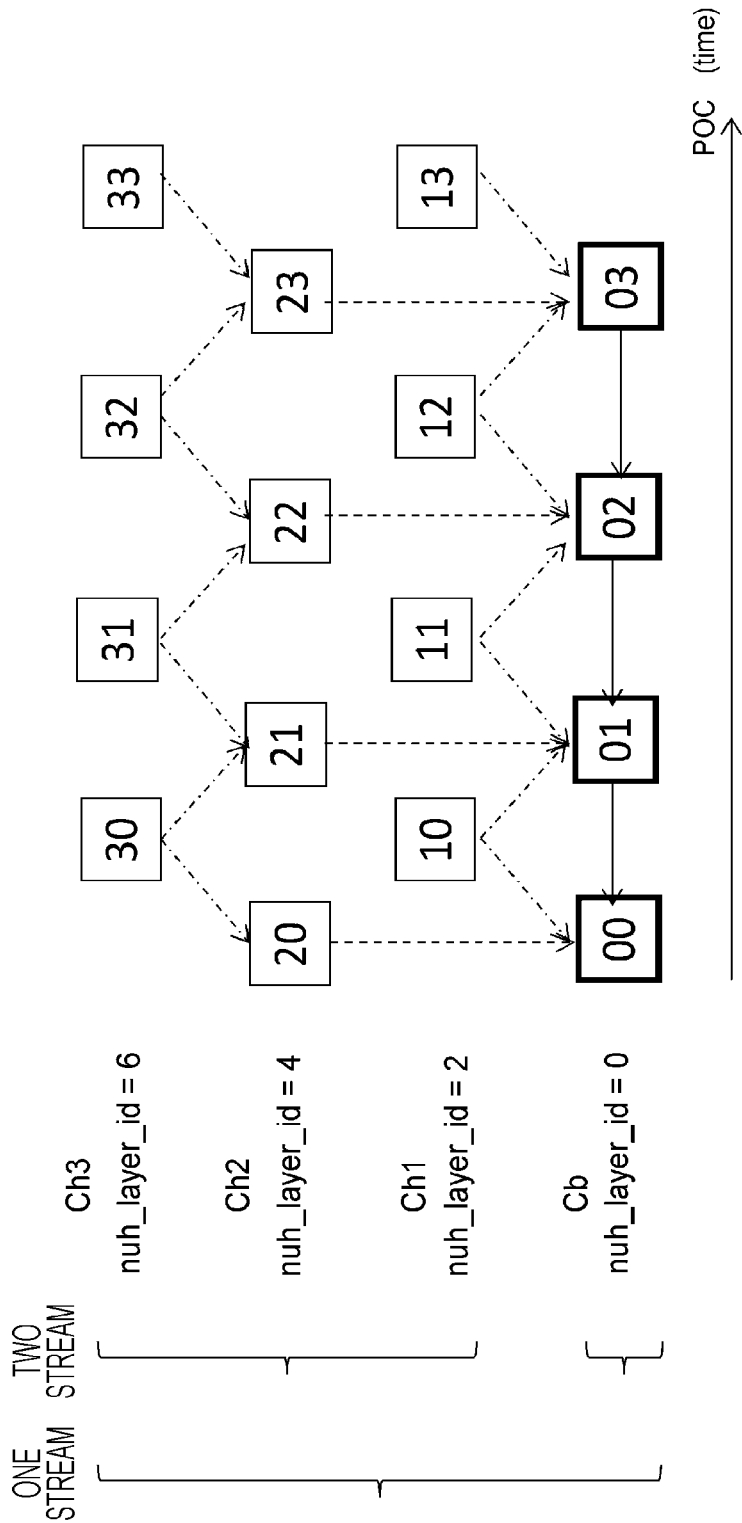

FIG. 7

Scalable_extension_descriptor

| Syntax | No. of Bits | Format |
|---|---|---|
| scalable_extension_descriptor(){ | | |
| descriptor_tag | 8 | uimsbf |
| descriptor_length | 8 | uimsbf |
| Extended_spatial_resolution_flag | 1 | bslbf |
| Extended_frame_rate_flag | 1 | bslbf |
| Extended_bit_depth_flag | 1 | bslbf |
| Extended_dynamic_range_flag | 1 | bslbf |
| Extended_color_gamut_flag | 1 | bslbf |
| reserved | 3 | 0x7 |
| number_of_layerIDs | 8 | |
| for ( I = 0; i< number_of_layerIDs ; i++) { | | |
| layerID | 6 | uimsbf |
| reserved | 2 | |
| } | | |
| } | | |

FIG. 8

Semantics of scalable_extension_descriptor

Extended_spatial_resolution_flag (1bit)
    INDICATE WHETHER OR NOT SPATIAL RESOLUTION EXTENSION COMPONENT IS INCLUDED.
        1      SPATIAL RESOLUTION EXTENSION COMPONENT IS INCLUDED
        0      SPATIAL RESOLUTION EXTENSION COMPONENT IS NOT INCLUDED Extended_frame_rate_flag (1bit)
    INDICATE WHETHER OR NOT FRAME RATE EXTENSION COMPONENT IS INCLUDED.
        1      FRAME RATE EXTENSION COMPONENT IS INCLUDED
        0      FRAME RATE EXTENSION COMPONENT IS NOT INCLUDED Extended_bit_depth_flag (1bit)
    INDICATE WHETHER OR NOT BIT LENGTH EXTENSION COMPONENT IS INCLUDED.
        1      BIT LENGTH EXTENSION COMPONENT IS INCLUDED
        0      BIT LENGTH EXTENSION COMPONENT IS NOT INCLUDED Extended_dynamic_range_flag (1bit)
    INDICATE WHETHER OR NOT DYNAMIC RANGE EXTENSION COMPONENT IS INCLUDED.
        1      DYNAMIC RANGE EXTENSION COMPONENT IS INCLUDED
        0      DYNAMIC RANGE EXTENSION COMPONENT IS NOT INCLUDED Extended_color_gamut_flag (1bit)
    INDICATE WHETHER OR NOT COLOR GAMUT EXTENSION COMPONENT IS INCLUDED.
        1      COLOR GAMUT EXTENSION COMPONENT IS INCLUDED
        0      COLOR GAMUT EXTENSION COMPONENT IS NOT INCLUDED number_of_layerIDs (8bits)
    INDICATE NUMBER OF LAYERS INCLUDED IN STREAM.

layerID (6bits)
    ID INDICATE LAYER ID.

FIG. 9

| NAL unit header | scalable_extension descriptor | |
|---|---|---|
| Nuh_layer_id | LayerID | flags | SEMANTICS |

| Nuh_layer_id | LayerID | flags | SEMANTICS |
|---|---|---|---|
| 0 | 0 | | INDICATE THAT BASIC COMPONENT IS INCLUDED |
| 1 | 1 | Extended_spatial_resolution_flag | INDICATE THAT SPATIAL EXTENSION COMPONENT IS INCLUDED |
| 2 | 2 | Extended_frame_rate_flag | INDICATE THAT FRAME RATE EXTENSION COMPONENT IS INCLUDED |
| 3 | 3 | Extended_bit_depth_flag | INDICATE THAT BIT LENGTH EXTENSION COMPONENT IS INCLUDED |
| 4 | 4 | Extended_dynamic_range_flag | INDICATE THAT DYNAMIC RANGE EXTENSION COMPONENT IS INCLUDED |
| 5 | 5 | Extended_color_gamut_flag | INDICATE THAT COLOR GAMUT EXTENSION COMPONENT IS INCLUDED |
| 6 | 6 | Extended_frame_rate_flag & Extended_dynamic_range_flag | INDICATE THAT FRAME RATE EXTENSION COMPONENT AND DYNAMIC RANGE EXTENSION COMPONENT ARE INCLUDED |
| 7 | 7 | Extended_spatial_resolution_flag & Extended_frame_rate_flag | INDICATE THAT SPATIAL EXTENSION COMPONENT AND FRAME RATE EXTENSION COMPONENT ARE INCLUDED |
| 8~63 | 8~63 | reserved | RESERVED |

FIG. 18

| NAL unit header | | scalable_extension descriptor | |
|---|---|---|---|
| nuh_layer_id | nuh_temporal_id_plus1 | LayerID | flags | SEMANTICS |
| 0 | 1~6 | 0 | | INDICATE THAT BASIC COMPONENT IS INCLUDED |
| 0 | 7 | 0 | Extended_frame_rate_flag | INDICATE THAT FRAME RATE EXTENSION COMPONENT IS INCLUDED |
| 4 | 1~6 | 4 | Extended_dynamic_range_flag | INDICATE THAT DYNAMIC RANGE EXTENSION COMPONENT IS INCLUDED |
| 4 | 7 | 4 | Extended_dynamic_range_flag And Extended_frame_rate_flag | INDICATE THAT FRAME RATE EXTENSION COMPONENT AND DYNAMIC RANGE EXTENSION COMPONENT ARE INCLUDED |

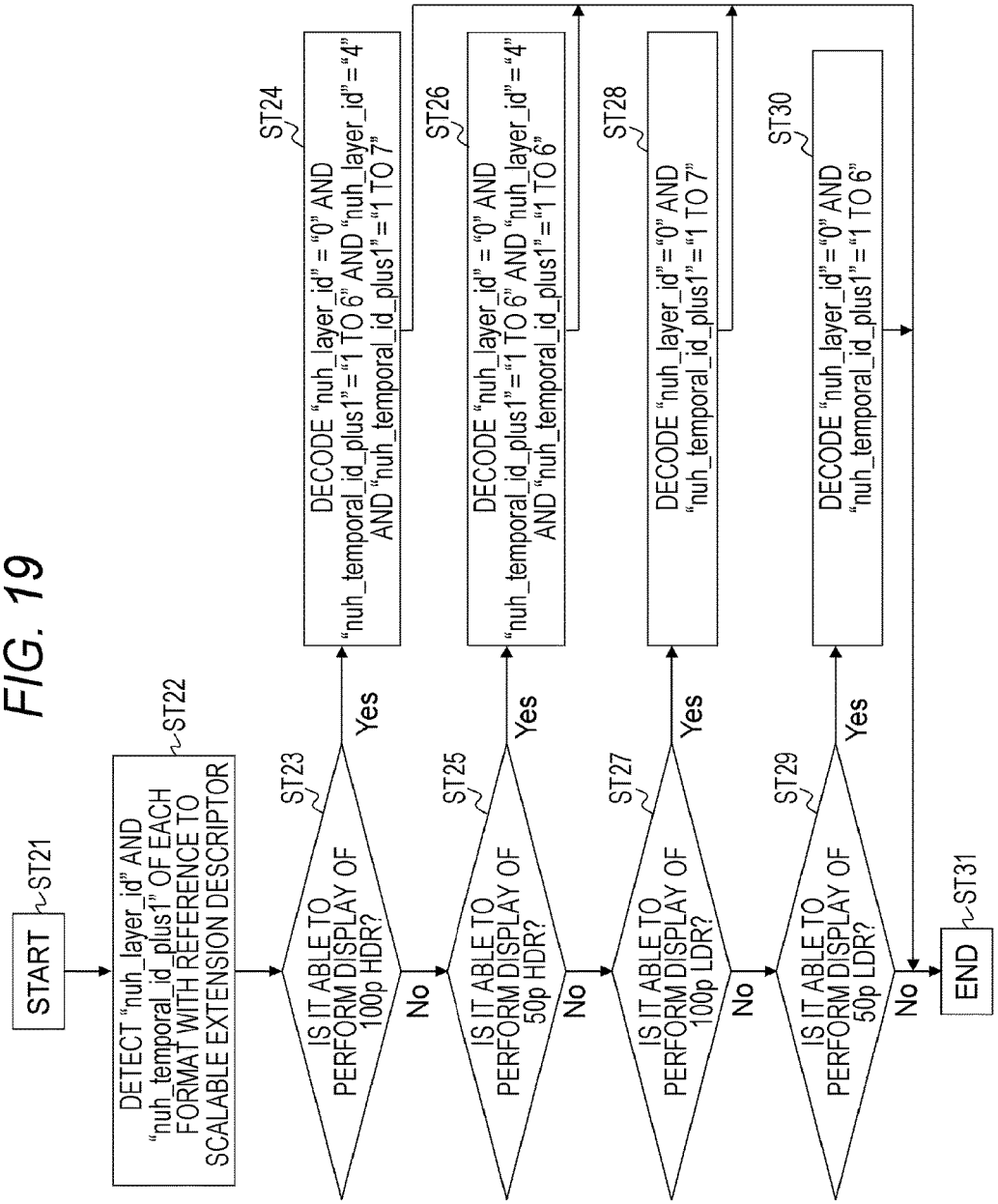

TRANSMISSION DEVICE, TRANSMISSION METHOD, AND RECEPTION DEVICE

TECHNICAL FIELD

The present technology relates to a transmission device, a transmission method, and a reception device, and more particularly, to a transmission device or the like that transmits a predetermined number of pieces of high-quality format image data together with basic format image data.

BACKGROUND ART

In the past, a technique in which high-quality format image data is transmitted together with basic format image data, and a reception side selectively uses the basic format image data or the high-quality format image data is known. For example, Patent Document 1 discloses a technique of performing media encoding in a scalable manner, generating a stream of a base layer for a low-resolution video service and a stream of an extension layer for a high-resolution video service, and transmitting a broadcast signal including the streams. Note that, as a high-quality format, in addition to a high resolution, there are a high frame frequency, a high dynamic range, a wide color gamut, a high bit length, and the like.

CITATION LIST

Patent Document

Patent Document 1: Japanese Patent Application National Publication (Laid-Open) No. 2008-543142

SUMMARY OF THE INVENTION

Problems to be Solved by the Invention

It is an object of the present technology to successfully transmit a predetermined number of pieces of high-quality format image data together with basic format image data.

Solutions to Problems

A concept of the present technology lies in
a transmission device, including:
an image encoding unit that generates a basic video stream including encoded image data of basic format image data and an extended video stream including encoded image data of each of a predetermined number of pieces of high-quality format image data; and
a transmission unit that transmits a container of a predetermined format including the basic video stream and the extended video stream generated by the image encoding unit,
wherein the image encoding unit inserts identification information identifying a corresponding format into the encoded image data of the basic format image data and each of the predetermined number of pieces of high-quality format image data.

In the present technology, an image encoding unit generates a basic video stream including encoded image data of basic format image data and an extended video stream including encoded image data of each of a predetermined number of pieces of high-quality format image data. For example, for the basic format image data, a predictive encoding process within basic format image data is performed. Further, for the high-quality format image data, a predictive encoding process within the high-quality format image data or an inter-predictive encoding process with the basic format image data or other high-quality format image data is performed.

A transmission unit transmits a container of a predetermined format including the basic video stream and the extended video stream generated by the image encoding unit. For example, the container may be a transport stream (MPEG-2 TS) employed in a digital broadcasting standard. Further, for example, the container may be MP4 used for Internet delivery or a container of any other format.

The image encoding unit inserts identification information identifying a corresponding format into the encoded image data of the basic format image data and each of the predetermined number of pieces of high-quality format image data. For example, the encoded image data may have a NAL unit structure, and the image encoding unit may insert the identification information into a header of the NAL unit.

In this case, for example, the image encoding unit may insert the identification information using a field of "nuh_layer_id" of the header of the NAL unit. Furthermore, in this case, for example, the image encoding unit may insert the identification information using fields of "nuh_layer_id" and "nuh_temporal_id_plus1" of the header of the NAL unit.

As described above, in the present technology, the identification information identifying a corresponding format is inserted into the encoded image data of the basic format image data and each of a predetermined number of pieces of high-quality format image data. Thus, the reception side can easily obtain image data according to a display capability by selectively performing a decoding process on predetermined encoded image data on the basis of the identification information.

Note that, in the present technology, for example, an information inserting unit that inserts information defining a format of the encoded image data indicated by the identification information inserted into the encoded image data into a layer of the container may further be included. In this case, for example, the container may be an MPEG2-TS, and the information inserting unit may insert the information into a video elementary stream loop corresponding to the video stream existing under a program map table. In this case, the reception side can detect the format of the encoded image data indicated by the identification information inserted into the encoded image data in the layer of the container in advance.

Furthermore, another concept of the present technology lies in
a reception device, including:
a reception unit that receives a container of a predetermined format including a basic video stream including encoded image data of basic format image data and an extended video stream including encoded image data of each of a predetermined number of pieces of high-quality format image data,
wherein identification information identifying a corresponding format is inserted into the encoded image data of the basic format image data and each of the predetermined number of pieces of high-quality format image data; and
a processing unit that processes the video streams included in the received container on the basis of the identification information and display capability information.

In the present technology, a reception unit receives a container of a predetermined format including a basic video stream and an extended video stream. Here, the basic video stream includes encoded image data of basic format image data. The extended video stream includes encoded image data of each of a predetermined number of pieces of high-quality format image data.

Identification information identifying a corresponding format is inserted into the encoded image data of the basic format image data and each of the predetermined number of pieces of high-quality format image data. For example, the encoded image data may have a NAL unit structure, and the identification information may be inserted into a header of the NAL unit. A processing unit processes the video streams included in the received container on the basis of the identification information and display capability information.

As described above, in the present technology, the extended video stream included in the received container is processed on the basis of the identification information identifying a corresponding format which is inserted into the encoded image data of the basic format image data and each of the predetermined number of pieces of high-quality format image data and display capability information. Thus, it is possible to selectively perform the decoding process on predetermined encoded image data and thus can easily obtain image data according to a display capability.

Note that, in the present technology, for example, information defining a format of the encoded image data indicated by the identification information inserted into the encoded image data may be inserted into a layer of the container, and the processing unit may detect a format of the encoded image data indicated by the identification information inserted into the encoded image data on the basis of the information inserted into the layer of the container.

Furthermore, another concept of the present technology lies in a transmission device, including:

an image encoding unit that generates a video stream including encoded image data of basic format image data and encoded image data of each of a predetermined number of pieces of high-quality format image data; and a transmission unit that transmits a container of a predetermined format including the video stream generated by the image encoding unit, wherein the image encoding unit inserts identification information identifying a corresponding format into the encoded image data of the basic format image data and each of the predetermined number of pieces of high-quality format image data.

In the present technology, an image encoding unit generates a video stream including encoded image data of basic format image data and each of a predetermined number of pieces of high-quality format image data. For example, for the basic format image data, a predictive encoding process within the basic format image data is performed. Further, for the high-quality format image data, a predictive encoding process within the high-quality format image data or an inter-predictive encoding process with the basic format image data or other high-quality format image data is performed.

A transmission unit transmits a container of a predetermined format including the video stream generated by the image encoding unit. For example, the container may be a transport stream (MPEG-2 TS) employed in a digital broadcasting standard. Further, for example, the container may be MP4 used for Internet delivery or a container of any other format.

The image encoding unit inserts identification information identifying a corresponding format into the encoded image data of the basic format image data and each of the predetermined number of pieces of high-quality format image data. For example, the encoded image data may have a NAL unit structure, and the image encoding unit may insert the identification information into a header of the NAL unit. In this case, for example, the image encoding unit may insert the identification information using a field of "nuh_layer_id" of the header of the NAL unit. Furthermore, in this case, for example, the image encoding unit may insert the identification information using fields of "nuh_layer_id" and "nuh_temporal_id_plus1" of the header of the NAL unit.

As described above, in the present technology, the identification information identifying a corresponding format is inserted into the encoded image data of the basic format image data and each of a predetermined number of pieces of high-quality format image data. Thus, the reception side can easily obtain image data according to a display capability by selectively performing a decoding process on predetermined encoded image data on the basis of the identification information.

Note that, in the present technology, for example, an information inserting unit that inserts information defining a format of the encoded image data indicated by the identification information inserted into the encoded image data into a layer of the container may further be included. In this case, for example, the container may be an MPEG2-TS, and the information inserting unit may insert the information into a video elementary stream loop corresponding to the video stream existing under a program map table. In this case, the reception side can detect the format of the encoded image data indicated by the identification information inserted into the encoded image data in the layer of the container in advance.

Furthermore, another concept of the present technology lies in a reception device, including:

a reception unit that receives a container of a predetermined format including a video stream including encoded image data of basic format image data and encoded image data of each of a predetermined number of pieces of high-quality format image data, wherein identification information identifying a corresponding format is inserted into the encoded image data of the basic format image data and each of the predetermined number of pieces of high-quality format image data; and a processing unit that processes the video stream included in the received container on the basis of the identification information and display capability information.

In the present technology, a reception unit receives a container of a predetermined format including a video stream including encoded image data of basic format image data and each of a predetermined number of pieces of high-quality format image data.

Identification information identifying a corresponding format is inserted into the encoded image data of the basic format image data and each of the predetermined number of pieces of high-quality format image data. For example, the encoded image data may have a NAL unit structure, and the identification information may be inserted into a header of the NAL unit. A processing unit processes the video stream included in the received container on the basis of the identification information and display capability information.

As described above, in the present technology, the video stream included in the received container is processed on the basis of the identification information identifying a corresponding format which is inserted into the encoded image data of the basic format image data and each of the predetermined number of pieces of high-quality format image data and display capability information. Thus, it is possible to selectively perform the decoding process on predetermined encoded image data and thus can easily obtain image data according to a display capability.

Note that, in the present technology, for example, information defining a format of the encoded image data indicated by the identification information inserted into the encoded image data may be inserted into a layer of the container, and the processing unit may detect a format of the encoded image data indicated by the identification information inserted into the encoded image data on the basis of the information inserted into the layer of the container.

Effects of the Invention

According to the present technology, it is possible to successfully transmit a predetermined number of pieces of high-quality format image data together with basic format image data. Note that the effect described herein is not necessarily limited and may include any effect described in the present disclosure.

BRIEF DESCRIPTION OF DRAWINGS

FIGS. 5(a) and 5(b) are diagrams illustrating an exemplary structure of a NAL unit header and content of main parameters in the exemplary structure.

FIG. 6 is a diagram illustrating an exemplary configuration of encoded image data Cb, Ch1, Ch2, and Ch3.

FIG. 7 is a diagram illustrating an exemplary structure of a scalable extension descriptor.

FIG. 8 is a diagram illustrating content of main information in an exemplary structure of the scalable extension descriptor.

FIG. 9 is a diagram illustrating a correspondence relation between a value of "nuh_layer_id" of a NAL unit header and description of the scalable extension descriptor.

FIG. 18 is a diagram illustrating a correspondence relation between values of "nuh_layer_id" and "nuh_temporal_id_plus1" of a NAL unit header and description of the scalable extension descriptor.

FIG. 19 is a flowchart illustrating another example of a process of determining a decoding range on the basis of display capability information (display performance information).

MODE FOR CARRYING OUT THE INVENTION

Hereinafter, modes of carrying out the invention (hereinafter, referred to as "embodiments") will be described. Note that the description will proceed in the following order.
1. Embodiment
2. Modified examples 1. Embodiment

Figure 1:
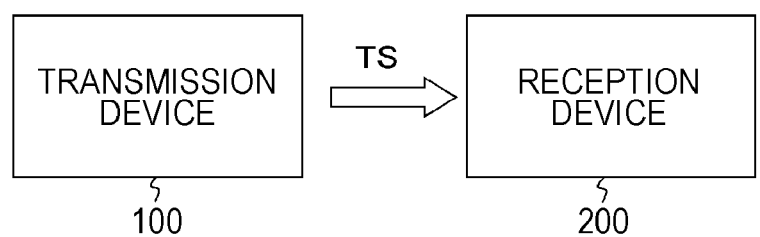
FIG. 1 is a block diagram illustrating an exemplary configuration of a transceiving system according to an embodiment.

[Transceiving System]
FIG. 1 illustrates an exemplary configuration of a transceiving system 10 according to an embodiment. The transceiving system 10 includes a transmission device 100 and a reception device 200. A transport stream TS serving as a container is included in broadcast wave or a network packet and transmitted from the transmission device 100 to the reception device 200. In this embodiment, there are two configurations: (1) a two-stream configuration in which the transport stream TS includes two video streams, that is, a basic video stream and an extended video stream; (2) a one-stream configuration in which the transport stream TS includes one video stream.

"Case of Two-Stream Configuration"
The transmission device 100 includes the transport stream TS serving as a container in the broadcast wave or the network packet and transmits a resulting signal. The two video streams, that is, the basic video stream and the extended video stream are included in the transport stream TS. The basic video stream includes encoded image data of basic format image data. For example, the basic video stream is generated by performing predictive encoding process of H.264/AVC, H.265/HEVC, or the like on the basic format image data.

The extended video stream includes encoded image data of each of a predetermined number of pieces of high-quality format image data. For example, the extended video stream is generated by performing the predictive encoding process of H.264/AVC, H.265/HEVC, or the like on a predetermined number of pieces of high-quality image data.

Identification information identifying a corresponding format is inserted into the encoded image data of the basic format image data and each of a predetermined number of pieces of high-quality format image data. The reception side can easily obtain image data according to a display capability by selectively performing a decoding process on predetermined encoded image data on the basis of the identification information. In this embodiment, the identification information is inserted to a header of a NAL unit.

Information defining a format of encoded image data indicated by the identification information inserted into the encoded image data is inserted into a layer of a container. The reception side can detect the format of the encoded image data indicated by the identification information inserted into the encoded image data in the layer of the container in advance on the basis of this information. In this embodiment, information is inserted into each video elementary stream loop corresponding to an extended video stream existing under a program map table.

The reception device 200 receives the transport stream TS that is included in the broadcast wave or the network packet and transmitted from the transmission device 100. The transport stream TS includes the basic video stream including the encoded image data of the basic format image data and the extended video stream including the encoded image data of each of a predetermined number of pieces of high-quality format image data as described above.

As described above, the identification information identifying a corresponding format is inserted into the encoded image data of each of a predetermined number of pieces of high-quality format image data. The reception device 200 processes the video streams included in the transport stream TS on the basis of the identification information and the display capability information, and acquires image data according to a display capability.

"Case of One-Stream Configuration"

The transmission device 100 includes the transport stream TS serving as a container in the broadcast wave or the network packet, and transmits a resulting signal. One video stream is included in the transport stream TS. The video stream includes the encoded image data of the basic format image data and the encoded image data of each of a predetermined number of pieces of high-quality format image data. For example, the video stream is generated by performing the predictive encoding process of H.264/AVC, H.265/HEVC, or the like on the basic format image data and a predetermined number of pieces of high-quality format image data.

Identification information identifying a basic format or a corresponding high-quality format is inserted into the encoded image data of the basic format image data and each of a predetermined number of pieces of high-quality format image data. The reception side can easily obtain the image data according to the display capability by selectively performing the decoding process on predetermined encoded image data on the basis of the identification information. In this embodiment, the identification information is inserted into the header of the NAL unit.

Information defining a format of encoded image data indicated by the identification information inserted into the encoded image data is inserted into the layer of the container. The reception side can detect the format of the encoded image data indicated by the identification information inserted into the encoded image data in the layer of the container in advance on the basis of this information. In this embodiment, information is inserted into each video elementary stream loop corresponding to a video stream existing under a program map table.

The reception device 200 receives the transport stream TS that is included in the broadcast wave or the network packet and transmitted from the transmission device 100. The transport stream TS includes the video stream including the encoded image data of the basic format image data and the encoded image data of each of a predetermined number of pieces of the high-quality format image data as described above.

As described above, the identification information identifying a corresponding format is inserted into the encoded image data of the basic format image data and each of a predetermined number of pieces of the high-quality format image data. The reception device 200 processes the video streams included in the transport stream TS on the basis of the identification information and the display capability information, and acquires image data according to a display capability.

"Configuration of Transmission Device"

Figure 2:
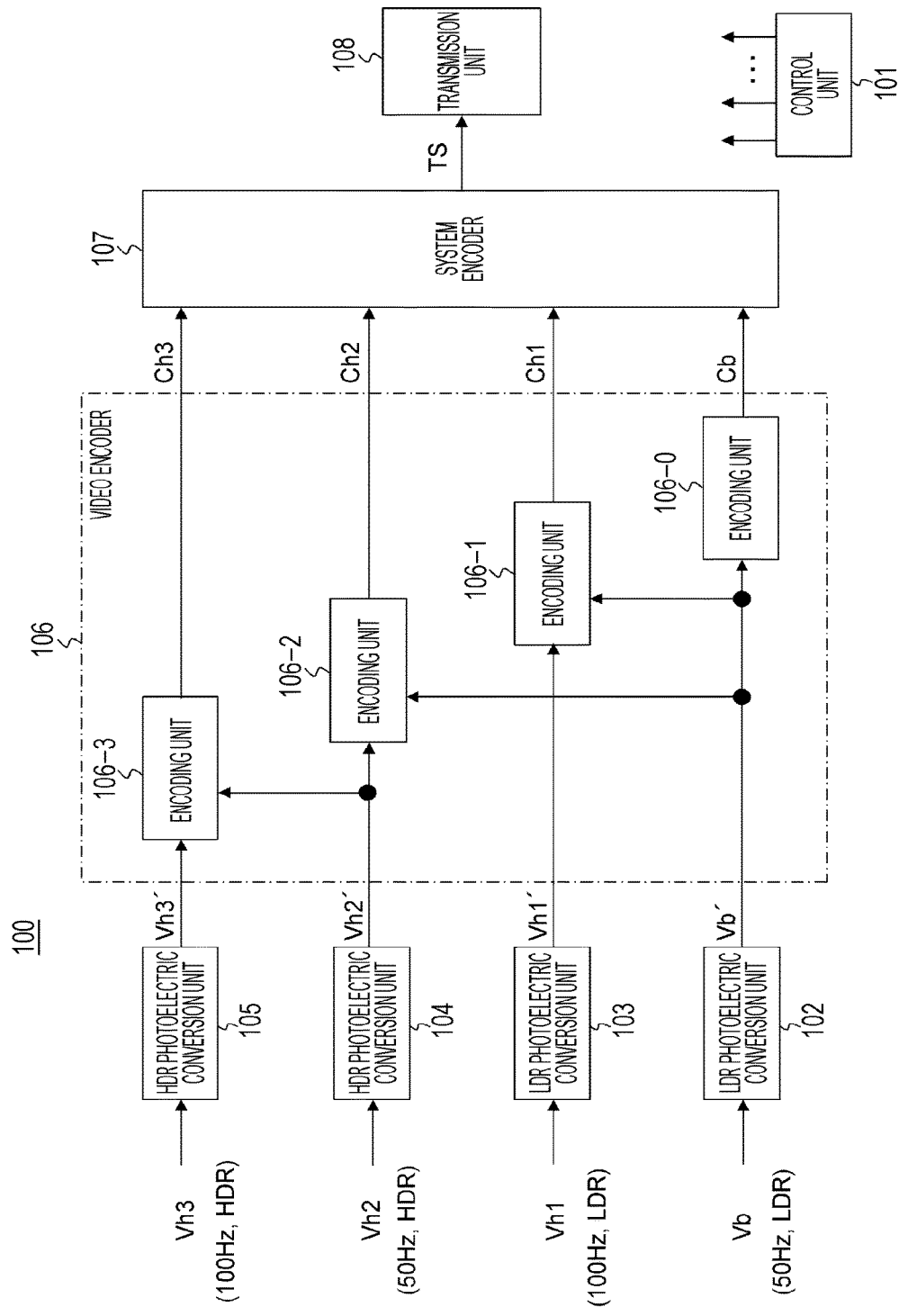
FIG. 2 is a block diagram illustrating an exemplary configuration of a transmission device.

FIG. 2 illustrates an exemplary configuration of the transmission device 100. The transmission device 100 deals with basic format image data Vb and three pieces of high-quality format image data Vh1, Vh2, and Vh3 as transmission image data. Here, the basic format image data Vb is low dynamic lange (LDR) image data whose frame frequency is 50 Hz. The high-quality format image data Vh1 is LDR image data whose frame frequency is 100 Hz. The LDR image data has a luminance range of 0% to 100% with respect to brightness of a white peak of an LDR image according to a related art.

The high-quality format image data Vh2 is high dynamic range (HDR) image data whose frame frequency is 50 Hz. The high-quality format image data Vh3 is HDR image data whose frame frequency is 100 Hz. The HDR image data has luminance of a range of 0 to 100%*N, for example, 0 to 1000% or more when brightness of a white peak of an LDR image according to a related art is assumed to be 100%.

Figure 3:
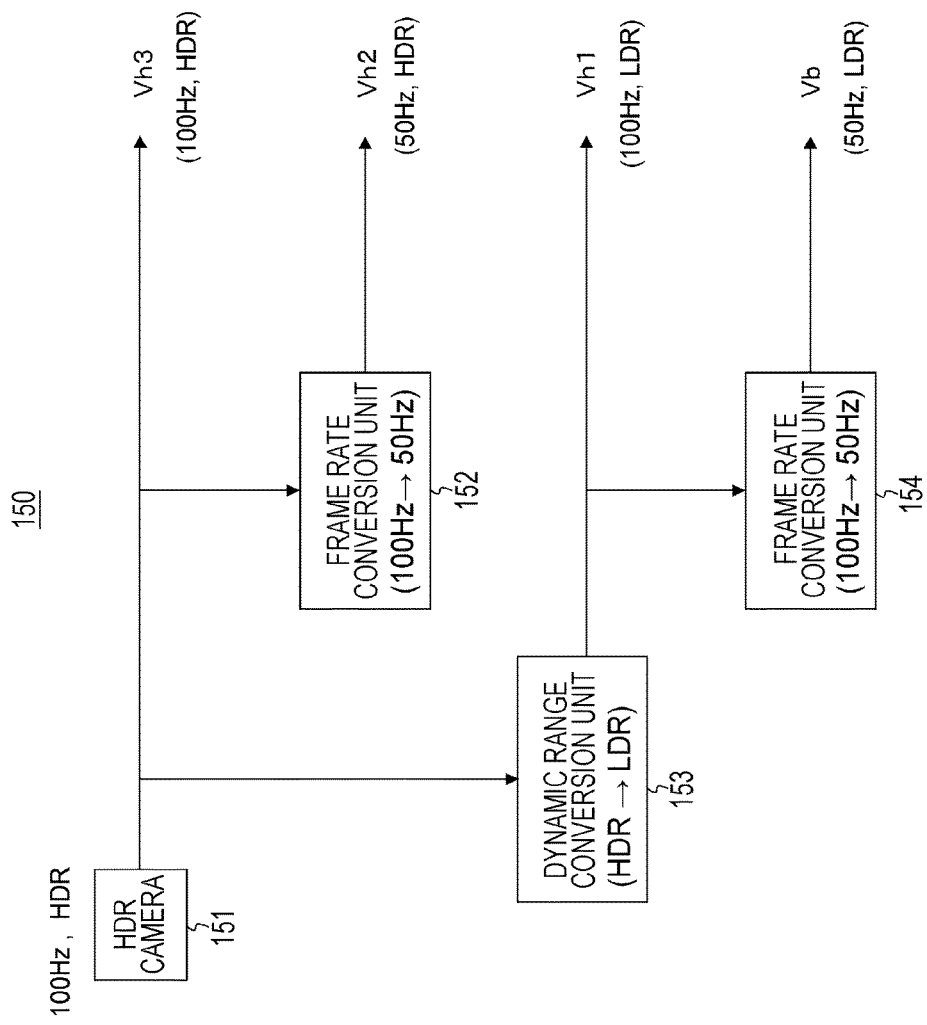
FIG. 3 is a block diagram illustrating an exemplary configuration of an image data generating unit that generates basic format image data Vb and three pieces of high-quality format image data Vh1, Vh2, and Vh3.

FIG. 3 illustrates an exemplary configuration of an image data generating unit 150 that generates the basic format image data Vb and the three pieces of high-quality format image data Vh1, Vh2, and Vh3. The image data generating unit 150 includes a HDR camera 151, a frame rate conversion unit 152, a dynamic range conversion unit 153, and a frame rate conversion unit 154.

The HDR camera 151 images a subject and outputs the HDR image data whose frame frequency is 100 Hz, that is, the high-quality format image data Vh3. The frame rate conversion unit 152 performs a process of converting the frame frequency of the high-quality format image data Vh3 output from the HDR camera 151 from 100 Hz to 50 Hz, and outputs the HDR image data whose frame frequency is 50 Hz, that is, the high-quality format image data Vh2.

The dynamic range conversion unit 153 performs a process of performing conversion from HDR to the LDR on the high-quality format image data Vh3 output from the HDR camera 151, and outputs the LDR image data whose frame frequency is 100 Hz, that is, the high-quality format image data Vh1. The frame rate conversion unit 154 performs a process of converting the frame frequency of the high-quality format image data Vh1 output from the dynamic range conversion unit 153 from 100 Hz to 50 Hz, and outputs the LDR image data whose frame frequency is 50 Hz, that is, the basic format image data Vb.

Referring back to FIG. 2, the transmission device 100 includes a control unit 101, LDR photoelectric conversion units 102 and 103, HDR photoelectric conversion units 104 and 105, a video encoder 106, a system encoder 107, and a transmission unit 108. The control unit 101 is configured with a central processing unit (CPU), and controls operations of the respective units of the transmission device 100 on the basis of a control program.

The LDR photoelectric conversion unit 102 applies a photoelectric conversion characteristic for an LDR image (an LDR OETF curve) to the basic format image data Vb, and obtains basic format image data Vb' for transmission. The LDR photoelectric conversion unit 103 applies the photoelectric conversion characteristic for the LDR image to the high-quality format image data Vh1, and obtains high-quality format image data Vh1' for transmission.

The HDR photoelectric conversion unit 104 applies a photoelectric conversion characteristic for a HDR image (a HDR OETF curve) to the high-quality format image data Vh2, and obtains high-quality format image data Vh2' for transmission. The HDR photoelectric conversion unit 105 applies the photoelectric conversion characteristic for the HDR image to the high-quality format image data Vh3, and obtains high-quality format image data Vh3' for transmission.

The video encoder 106 includes four encoding units 106-0, 106-1, 106-2, and 106-3. The encoding unit 106-0 performs the predictive encoding process of H.264/AVC, H.265/HEVC, or the like on the basic format image data Vb' for transmission, and obtains encoded image data Cb. In this case, the encoding unit 106-0 performs prediction within the image data Vb'.

The encoding unit 106-1 performs the predictive encoding process of H.264/AVC, H.265/HEVC, or the like on the high-quality format image data Vh1' for transmission, and obtains encoded image data Ch1. In this case, in order to reduce a predictive residual, the encoding unit 106-1 selectively performs prediction within the image data Vh1' or inter-prediction with the image data Vb' in units of encoding blocks.

The encoding unit 106-2 performs the predictive encoding process of H.264/AVC, H.265/HEVC, or the like on the high-quality format image data Vh2' for transmission, and obtains encoded image data Ch2. In this case, in order to reduce a predictive residual, the encoding unit 106-2 selectively performs prediction within the image data Vh2' or inter-prediction with the image data Vb' in units of encoding blocks.

The encoding unit 106-3 performs the predictive encoding process of H.264/AVC, H.265/HEVC, or the like on the high-quality format image data Vh3' for transmission, and obtains encoded image data Ch3. In this case, in order to reduce a predictive residual, the encoding unit 106-3 selectively performs prediction within the image data Vh3' or inter-prediction with the image data Vh2' in units of encoding blocks.

Figure 4:
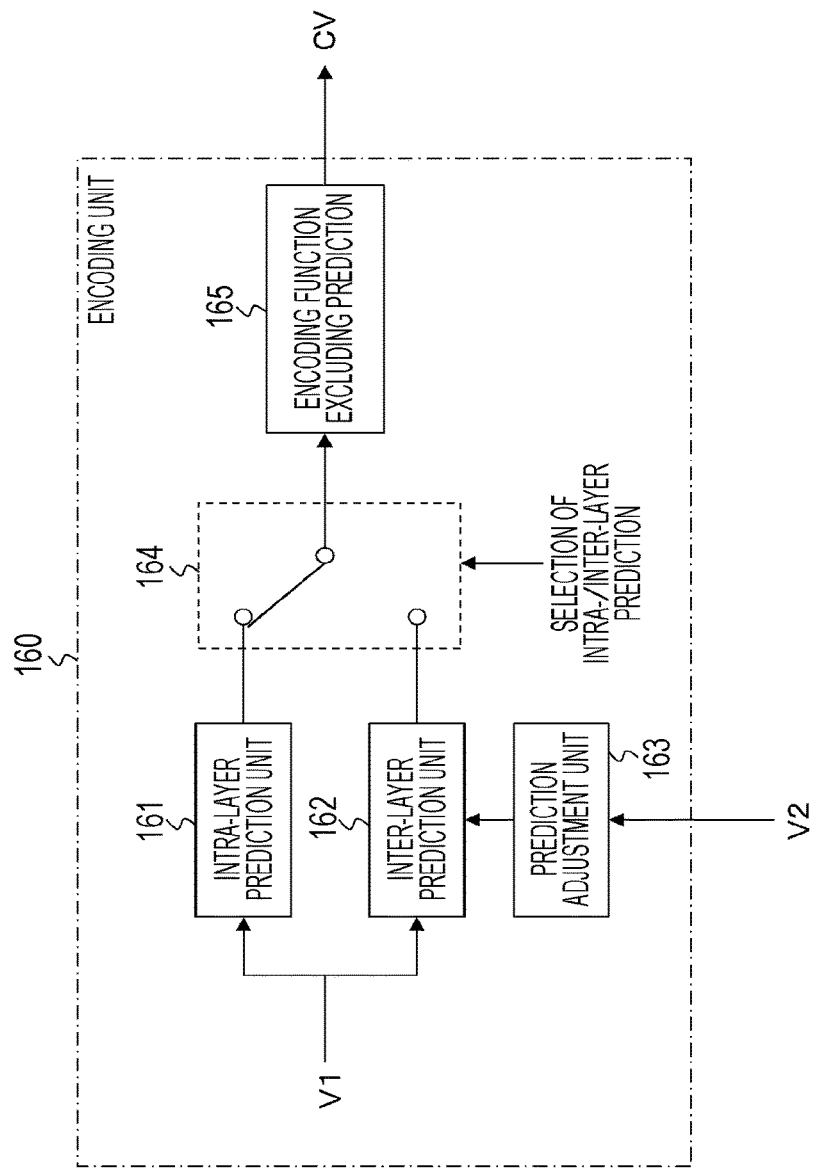
FIG. 4 is a block diagram illustrating an exemplary configuration of a main part of an encoding unit.

FIG. 4 illustrates an exemplary configuration of a main part of an encoding unit 160. The encoding unit 160 can be applied to the encoding units 106-1, 106-2, and 106-3. The encoding unit 160 includes an intra-layer prediction unit 161, an inter-layer prediction unit 162, a prediction adjustment unit 163, a selection unit 164, and an encoding function unit 165.

The intra-layer prediction unit 161 performs prediction within image data V1 (intra-layer prediction) on the image data V1 to be currently encoded, and obtains predictive residual data. The inter-layer prediction unit 162 performs inter-prediction with the image data V2 to be referred to (inter-layer prediction) on the image data V1 to be currently encoded, and obtains predictive residual data.

The prediction adjustment unit 163 performs the following process according to a scalable extension type of the image data V1 for the image data V2 so that the inter-layer prediction is efficiently performed in the inter-layer prediction unit 162. In the case of dynamic range extension, a level adjustment for converting the LDR into the HDR is performed. In the case of spatial scalable extension, a scaling process of scaling a block of another layer to a predetermined size is performed. In the case of frame rate extension, it is bypassed. In the case of color gamut extension, mapping is performed on each of luminance and chrominance. In the case of bit length extension, conversion for aligning an MSB of a pixel is performed.

For example, in the case of the encoding unit 106-1, the image data V1 is the high-quality format image data Vh1' (100 Hz, LDR), the image data V2 is the basic format image data Vb' (50 Hz, LDR), and the scalable extension type is the frame rate extension. For this reason, in the prediction adjustment unit 163, the image data Vb' is bypassed without change.

Further, for example, in the case of the encoding unit 106-2, the image data V1 is the high-quality format image data Vh2' (50 Hz, HDR), the image data V2 is the basic format image data Vb' (50 Hz, LDR), and the scalable extension type is the dynamic range extension. For this reason, in the prediction adjustment unit 163, a level adjustment for converting the LDR into the HDR is performed on the image data Vb'. Note that the level adjustment may be performed on the basis of information supplied from the dynamic range conversion unit 153.

Further, for example, in the case of the encoding unit 106-3, the image data V1 is the high-quality format image data Vh3' (100 Hz, HDR), the image data V2 is the high-quality format image data Vh2' (50 Hz, HDR), and the scalable extension type is the frame rate extension. For this reason, in the prediction adjustment unit 163, the image data Vb' is bypassed without change.

The selection unit 164 selectively extracts the predictive residual data obtained by the intra-layer prediction unit 161 or the predictive residual data obtained by the inter-layer prediction unit 162 in units of encoding blocks, and transfers the selected predictive residual data to the encoding function unit 165. In this case, the selection unit 164 selects, for example, the predictive residual data that is smaller in the predictive residual. The encoding function unit 165 performs an encoding process such as transform encoding, quantization, and entropy encoding on the predictive residual data selected by the selection unit 164, and obtains encoded image data CV.

Referring back to FIG. 2, the video encoder 106 inserts the identification information identifying a corresponding format into each of the encoded image data Cb, Ch1, Ch2, and Ch3. The video encoder 106 inserts the identification information into, for example, the header of the NAL unit.

FIG. 5(*a*) illustrates an exemplary structure (syntax) of a NAL unit header, and FIG. 5(*b*) illustrates content (semantics) of main parameters in the exemplary structure. A 1-bit field of "forbidden_zero_bit" is mandatorily 0. A 6-bit field of "nal_unit_type" indicates a NAL unit type. A 6-bit field of "nuh_layer_id" is an ID indicating a layer extension type of a stream. A 3-bit field of "nuh_temporal_id_plus1" indicates temporal_id (0 to 6) and has a value (1 to 7) obtained by adding 1.

In this embodiment, the 6-bit field of "nuh_layer_id" indicates identification information identifying a format corresponding to the NAL unit (the encoded image data). For example, "0" indicates basic. "1" indicates the spatial extension. "2" indicates the frame rate extension. "3" indicates the bit length extension. "4" indicates the dynamic range extension. "5" indicates wide color gamut extension. "6" indicates the frame rate extension and the dynamic range extension. "7" indicates the spatial extension and the frame rate extension.

The encoded image data Cb corresponds to the basic format image data Vb, and "nuh_layer_id" of the encoded image data Cb is "0." Further, the encoded image data Ch1 corresponds to the frame rate extension format image data Vh1, and "nuh_layer_id" of the encoded image data Ch1 is "2." Further, the encoded image data Ch2 corresponds to the dynamic range extension format image data Vh2, and "nuh_layer_id" of the encoded image data Ch2 is "4." Further, the encoded image data Ch3 corresponds to the format image data Vh3 of the frame rate extension and the dynamic range extension, and "nuh_layer_id" of the encoded image data Ch3 is "6."

FIG. 6 illustrates an exemplary configuration of the encoded image data Cb, Ch1, Ch2, and Ch3. A horizontal axis indicates a display order (a picture order of composition (POC)), and a display time goes to an earlier time as it gets closer to a left side and goes to a future time as it gets closer to a right side. Each of rectangular frames indicates a picture, and an arrow indicates a reference relation of a picture in the predictive encoding process. In both of the inter-layer prediction and the intra-layer prediction, a current picture changes in units of blocks, and a prediction direction and the number of references are not limited to an example illustrated in FIG. 6.

The encoded image data Cb is configured with encoded image data of pictures "00," "01," . . . . The encoded image data Ch1 is configured with encoded image data of pictures "10," "11," . . . positioned between every two of the pictures of the encoded image data Cb. The encoded image data Ch2 is configured with encoded image data of pictures "20," "21," . . . at the same positions as the pictures of the encoded image data Cb. In addition, the encoded image data Ch3 is configured with encoded image data of pictures "30," "31," . . . positioned between every two of the pictures of the encoded image data Ch2.

Referring back to FIG. 2, the system encoder 107 generates a video stream using the encoded image data Cb, Ch1, Ch2, and Ch3 generated by the video encoder 106, and generates the transport stream TS by performing PES packetization and TS packetization. Then, the transmission unit 108 includes the transport stream TS in the broadcast wave or the network packet, and transmits a resulting signal to the reception device 200.

Here, in the case of the two-stream configuration, the system encoder 107 generates a basic video stream including the encoded image data Cb and an extended video stream including the encoded image data Ch1, Ch2, and Ch3. In other words, in this case, the transport stream TS includes two video streams, that is, the basic video stream including the encoded image data Cb and the extended video stream including the encoded image data Ch1, Ch2, and Ch3.

Further, in the case of the one-stream configuration, the system encoder 107 generates a video stream including the encoded image data Cb, Ch1, Ch2, and Ch3. In other words, in this case, the transport stream TS includes one video stream including the encoded image data Cb, Ch1, Ch2, and Ch3.

The system encoder 107 inserts the information defining the format of the encoded image data indicated by the identification information inserted into the encoded image data into the layer of the container (the transport stream).

In this embodiment, in the case of the two-stream configuration, a scalable extension descriptor is inserted into a video elementary stream loop corresponding to the extended video stream (including the encoded data Ch1, Ch2, and Ch3) existing under the program map table (PMT). In this case, the format of the encoded image data indicated by the identification information inserted into the encoded image data Ch1, Ch2, and Ch3 is defined.

Further, in this embodiment, in the case of the one-stream configuration, the scalable extension descriptor is inserted into a video elementary stream loop corresponding to the video stream (including the encoded image data Cb, Ch1, Ch2, and Ch3) existing under the program map table (PMT). In this case, the format of the encoded image data indicated by the identification information inserted into the encoded image data Cb, Ch1, Ch2, and Ch3 is defined.

FIG. 7 illustrates an exemplary structure (syntax) of the scalable extension descriptor. FIG. 8 illustrates content (semantics) of main information in the exemplary structure illustrated in FIG. 7. An 8-bit field of "descriptor_tag" indicates a descriptor type and indicates that the descriptor is the scalable extension descriptor. An 8-bit field of "descriptor_length" indicates a length (size) of the descriptor, and indicates the number of subsequent bytes as the length of the descriptor.

A flag of "Extended_spatial_resolution_flag" indicates whether or not a spatial resolution extension component is included. "1" indicates that the spatial resolution extension component is included, and "0" indicates that the spatial resolution extension component is not included. A flag of "Extended_frame_rate_flag" indicates whether or not a frame rate extension component is included. "1" indicates that a frame rate extension component is included, and "0" indicates that the frame rate extension component is not included.

A flag of "Extended_bit_depth_flag" indicates whether or not a bit length extension component is included. "1" indicates that the bit length extension component is included, and "0" indicates that the bit length extension component is not included. A flag of "Extended_dynamic_range_flag" indicates whether or not a dynamic range extension component is included. "1" indicates that the dynamic range extension component is included, and "0" indicates that the dynamic range extension component is not included. A flag of "Extended_color_gamut_flag" indicates whether or not a color gamut extension component is included. "1" indicates that the color gamut extension component is included, and "0" indicates that the color gamut extension component is not included.

An 8-bit field of "number_of_layerIDs" indicates the number of layers included in a stream. There are 6-bit fields of "layerID" that correspond in number to the number of layers. A field of "layerID" indicates a layer ID (Layer_id).

Here, in the case of the two-stream configuration, when the extended video stream includes the encoded image data Ch1, Ch2, and Ch3, "Extended_spatial_resolution_flag," "Extended_bit_depth_flag," and "Extended_color_gamut_flag" are set to "0," and "Extended_frame_rate_flag" and "Extended_dynamic_range_flag" are set to "1." Further, "number_of_layerIDs" is set to "3," and "2," "4," and "6" are set in order as "layerID."

Through this setting, "layerID"="2" indicates the frame rate extension, and thus "nuh_layer_id"="2" of the header of the NAL unit is defined to indicate the encoded image data of the frame rate extension. Further, "layerID"="4" indicates the dynamic range extension, and thus "nuh_layer_id"="4" of the header of the NAL unit is defined to indicate the encoded image data of the dynamic range extension. Further, "layerID"="6" indicates the frame rate extension and the dynamic range extension, and thus "nuh_layer_id"="6" of the header of the NAL unit is defined to indicate the encoded image data of the frame rate extension and the dynamic range extension.

Further, in the case of the one-stream configuration, when the video stream includes the encoded data Cb, Ch1, Ch2, and Ch3, "Extended_spatial_resolution_flag," "Extended_bit_depth_flag," and "Extended_color_gamut_flag" are set to "0," and "Extended_frame_rate_flag" and "Extended_dynamic_range_flag" are set to "1." Further, "number_of_layerIDs" is set to "4," and "0," "2," "4," and "6" are set in order as "layerID."

Through this setting, "layerID"="0" indicates basic, and thus "nuh_layer_id"="0" of the header of the NAL unit is defined to indicate the encoded image data of the basic format. Further, "layerID"="2" indicates the frame rate extension, and thus "nuh_layer_id"="2" of the header of the NAL unit is defined to indicate the encoded image data of the frame rate extension. Further, "layerID"="4" indicates the dynamic range extension, and thus "nuh_layer_id"="4" of the header of the NAL unit is defined to indicate the encoded image data of the dynamic range extension. Further, "layerID"="6" indicates the frame rate extension and the dynamic range extension, and thus "nuh_layer_id"="6" of the header of the NAL unit is defined to indicate the encoded image data of the frame rate extension and the dynamic range extension.

FIG. 9 illustrates a correspondence relation between values of "nuh_layer_id" of the NAL unit header and description of the scalable extension descriptor. In other words, when the encoded image data of the basic format (the basic component) of "nuh_layer_id"="0" is included in the stream, "0" is set as "layerID."

Further, when the encoded image data of the spatial extension (the spatial extension component) of "nuh_layer_id"="1" is included in the stream, "Extended_spatial_resolution_flag" is set to "1," and "1" is set as "layerID." Further, when the encoded image data of the frame rate extension (the frame rate extension component) of "nuh_layer_id"="2" is included in the stream, "Extended_frame_rate_flag" is set to "1," and "2" is set as "layerID." Further, when the encoded image data of the frame rate extension (the bit length extension component) of "nuh_layer_id"="3" is included in the stream, "Extended_bit_depth_flag" is set to "1," and "3" is set as "layerID."

Further, when the encoded image data of the dynamic range extension (the dynamic range extension component) of "nuh_layer_id"="4" is included in the stream, "Extended_dynamic_range_flag" is set to "1," and "4" is set as "layerID." Further, when the encoded image data of the color gamut extension (the color gamut extension component) of "nuh_layer_id"="5" is included in the stream, "Extended_color_gamut_flag" is set to "1," and "5" is set as "layerID."

Further, when the encoded image data of the frame rate extension and the dynamic range extension (the frame rate extension component and the dynamic range extension component) of "nuh_layer_id"="6" is included in the stream, "Extended_frame_rate_flag" and "Extended_dynamic_range_flag" are set to "1," and "6" is set as "layerID." Further, when the encoded image data of the spatial extension and the frame rate extension (the spatial extension component and the frame rate extension component) of "nuh_layer_id"="7" is included in the stream, "Extended_spatial_resolution_flag" and "Extended_frame_rate_flag" are set to "1," and "7" is set as "layerID."

[Configuration of Transport Stream TS]

Figure 10:
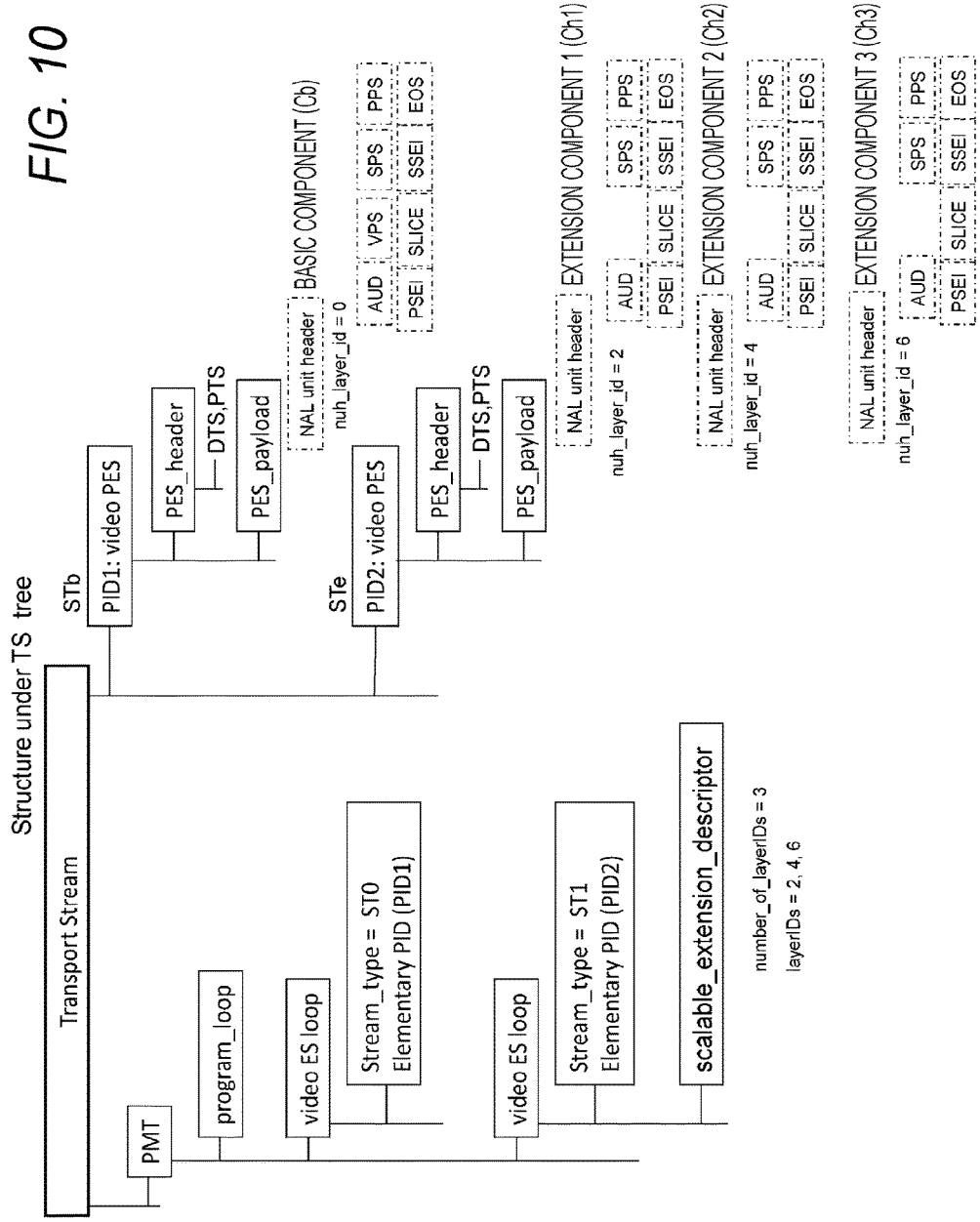
FIG. 10 is a diagram illustrating an exemplary configuration of a transport stream TS (in the case of two streams).

FIG. 10 illustrates an exemplary configuration of the transport stream TS in the case of the two-stream configuration. Two video streams, that is, a basic video stream STb and an extended video stream STe are included in the transport stream TS. In this exemplary configuration, there is a PES packet "video PES" of each video stream.

A packet identifier (PID) of the basic video stream STb is, for example, PID1. The encoded image data of the pictures of the basic format is included in the basic video stream STb. In the encoded image data of the pictures of the basic format, there are NAL units such as AUD, VPS, SPS, PPS, PSEI, SLICE, SSEI, and EOS. In the headers of the NAL units, "nuh_layer_id" is set to, for example, "0" and indicates the encoded image data related to the basic format.

Further, a packet identifier (PID) of the extended video stream STe is, for example, PID2. The encoded image data of the pictures of the three high-quality formats, that is, the frame rate extension, the dynamic range extension, and the frame rate extension and the dynamic range extension is included in the extended video stream STe. In the encoded image data of the pictures of the high-quality format, there are NAL units such as AUD, SPS, PPS, PSEI, SLICE, SSEI, and EOS.

Note that the SPS in the encoded image data of the pictures of the basic format and the SPS in the encoded image data of the pictures of the high-quality format are the same in a value of "nal_unit_type" but differ in whether or not an extension is included therein. In other words, the SPS in the encoded image data of the pictures of the high-quality format includes an SPS extension. Note that, the SPS of the basic format and the SPS of the high-quality format may have different values of "nal_unit_type."

In the header of the NAL unit constituting the encoded image data of the pictures of the frame rate extension, "nuh_layer_id" is set to "2" and indicates the encoded image data related to the frame rate extension. Further, in the header of the NAL unit constituting the encoded image data of the pictures of the dynamic range extension, "nuh_layer_id" is set to "4" and indicates the encoded image data related to the dynamic range extension. Further, in the header of the NAL unit constituting the encoded image data of the pictures of the frame rate extension and the dynamic range extension, "nuh_layer_id" is set to "6" and indicates the encoded image data related to the frame rate extension and the dynamic range extension.

Further, the program map table (PMT) is included in the transport stream TS as program specific information (PSI). The PSI is information indicating a program associated with each elementary stream included in the transport stream.

A program loop describing information associated with all programs is included in the PMT. Further, an elementary stream loop including information associated with each elementary stream is included in the PMT. In this exemplary configuration, two video elementary stream loops (video ES loops) are included in association with the two video streams, that is, the basic video stream STb and the extended video stream STe. Information such as a stream type (ST0) and a packet identifier (PID1) is arranged in the video elementary stream loop corresponding to the basic video stream STb.

Further, in the video elementary stream loop corresponding to the extended video stream STe, information such as a stream type (ST1) and a packet identifier (PID2) is arranged, and a descriptor describing information associated with the extended video stream STe is also arranged. The scalable extension descriptor (see FIG. 7) is inserted as one of the descriptors.

In this descriptor, "Extended_frame_rate_flag" and "Extended_dynamic_range_flag" are set to "1," and "number_of_layerIDs" is set to "3," and "2," "4," and "6" are set in order as "layerID." Thus, "nuh_layer_id"="2" of the header of the NAL unit is defined to indicate the encoded image data of the frame rate extension. Further, "nuh_layer_id"="4" of the header of the NAL unit is defined to indicate the encoded image data of the dynamic range extension. Further, "nuh_layer_id"="6" of the header of the NAL unit is defined to indicate the encoded image data of the frame rate extension and the dynamic range extension.

Figure 11:
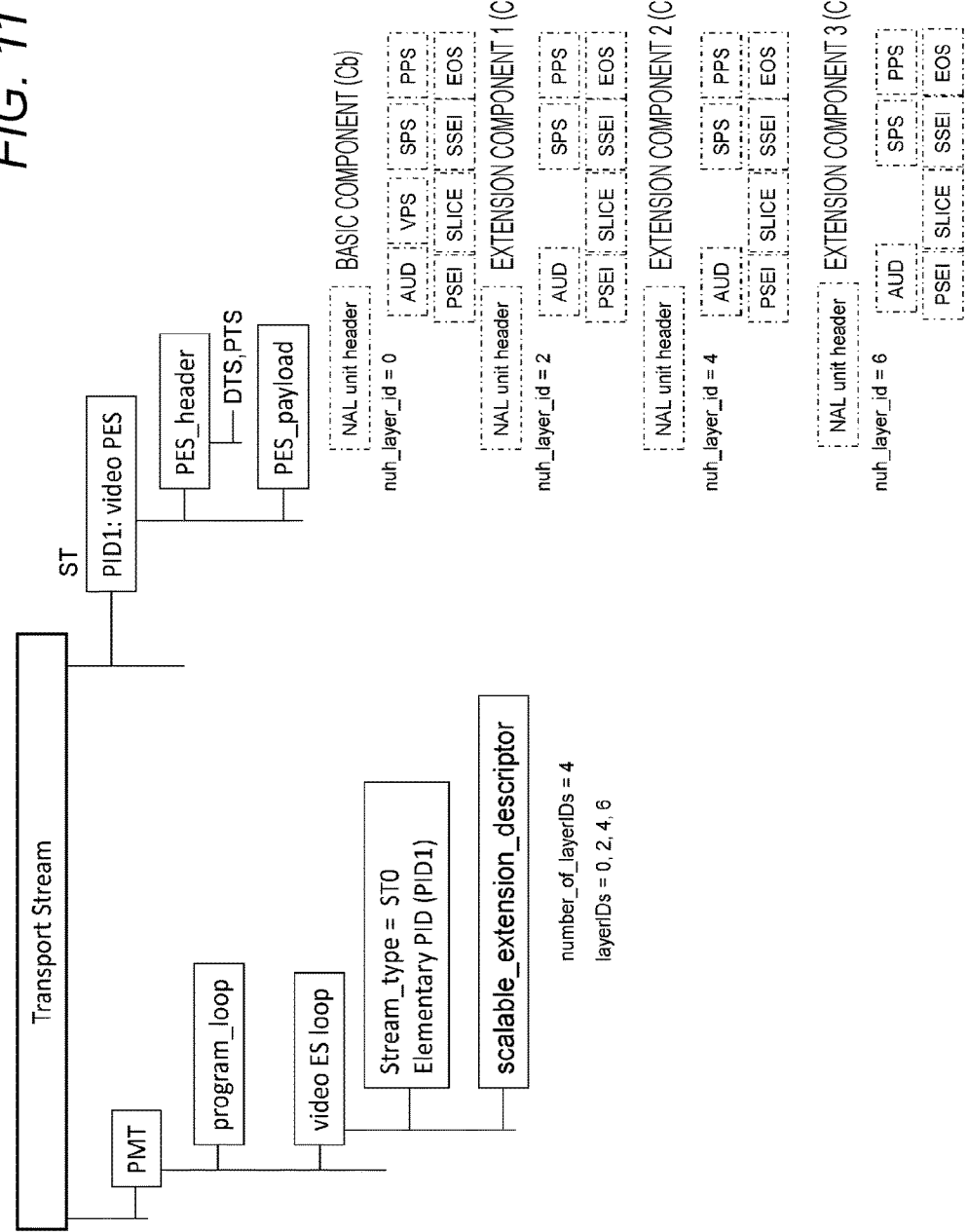
FIG. 11 is a diagram illustrating an exemplary configuration of a transport stream TS (in the case of one stream).

FIG. 11 illustrates an exemplary configuration of the transport stream TS in the case of the one-stream configuration. One video stream ST is included into the transport stream TS. In this exemplary configuration, there is the PES packet "video PES" of the video stream ST.

A packet identifier (PID) of the video stream ST is set to, for example, PID1. In the video stream ST, the encoded image data of the pictures of the basic format is included, and the encoded image data of the pictures of the three high-quality formats, that is, the frame rate extension, the dynamic range extension, and the frame rate extension and the dynamic range extension is included.

In the encoded image data of the pictures of the basic format, there are NAL units such as AUD, VPS, SPS, PPS, PSEI, SLICE, SSEI, and EOS. In the headers of the NAL units, "nuh_layer_id" is set to, for example, "0" and indicates the encoded image data related to the basic format.

Further, in the encoded image data of the pictures of the high-quality format, there are NAL units such as AUD, SPS, PPS, PSEI, SLICE, SSEI, and EOS. Note that, the SPS in the encoded image data of the pictures of the basic format and the SPS in the encoded image data of the pictures of the high-quality format are the same in a value of "nal_unit_type" but differ in whether or not an extension is included therein. In other words, the SPS in the encoded image data of the pictures of the high-quality format includes an SPS extension.

In the header of the NAL unit constituting the encoded image data of the pictures of the frame rate extension, "nuh_layer_id" is set to "2" and indicates the encoded image data related to the frame rate extension. Further, in the header of the NAL unit constituting the encoded image data of the pictures of the dynamic range extension, "nuh_layer_id" is set to "4" and indicates the encoded image data related to the dynamic range extension. Further, in the header of the NAL unit constituting the encoded image data of the pictures of the frame rate extension and the dynamic range extension, "nuh_layer_id" is set to "6" and indicates the encoded image data related to the frame rate extension and the dynamic range extension.

Further, the program map table (PMT) is included in the transport stream TS as the program specific information (PSI). The PSI is information indicating a program associated with each elementary stream included in the transport stream.

A program loop describing information associated with all programs is included in the PMT. Further, an elementary stream loop including information associated with each elementary stream is included in the PMT. In this exemplary configuration, one video elementary stream loop (video ES loop) is included in association with one video stream ST.

In the video elementary stream loop, information such as a stream type (ST0) and a packet identifier (PID1) is arranged, and a descriptor describing information associated with the video stream ST is also arranged. The scalable extension descriptor (see FIG. 7) is inserted as one of the descriptors.

In this descriptor, "Extended_frame_rate_flag" and "Extended_dynamic_range_flag" are set to "1," "number of_layerIDs" is set to "4," and "0," "2," "4," and "6" are set in order as "layerID." Thus, "nuh_layer_id"="0" of the header of the NAL unit is defined to indicate the encoded image data of the basic format. "nuh_layer_id"="2" of the header of the NAL unit is defined to indicate the encoded image data of the frame rate extension. Further, "nuh_layer_id"="4" of the header of the NAL unit is defined to indicate the encoded image data of the dynamic range extension. Further, "nuh_layer_id"="6" of the header of the NAL unit is defined to indicate the encoded image data of the frame rate extension and the dynamic range extension.

An operation of the transmission device 100 illustrated in FIG. 2 will be briefly described. The basic format image data Vb serving as the LDR image data whose frame frequency is 50 Hz is supplied to the LDR photoelectric conversion unit 102. The LDR photoelectric conversion unit 102 applies the photoelectric conversion characteristic for the LDR image (LDR OETF curve) to the basic format image data Vb, and obtains the basic format image data Vb' for transmission. The basic format image data Vb' is supplied to the encoding units 106-0, 106-1, and 106-2 of the video encoder 106.

Further, the high-quality format image data Vh1 serving as the LDR image data whose frame frequency is 100 Hz is supplied to the LDR photoelectric conversion unit 103. The LDR photoelectric conversion unit 103 applies the photoelectric conversion characteristic for the LDR image (LDR OETF curve) to the high-quality format image data Vh1, and obtains the high-quality format image data Vh1' for transmission. The high-quality format image data Vh1' is supplied to the encoding unit 106-1 of the video encoder 106.

Further, the high-quality format image data Vh2 serving as the HDR image data whose frame frequency is 50 Hz is supplied to the HDR photoelectric conversion unit 104. The HDR photoelectric conversion unit 104 applies the photoelectric conversion characteristic for the HDR image (HDR OETF curve) to the high-quality format image data Vh2, and obtains the high-quality format image data Vh2' for transmission. The high-quality format image data Vh2' is supplied to the encoding units 106-2 and 106-3 of the video encoder 106.

Further, the high-quality format image data Vh3 serving as the HDR image data whose frame frequency is 100 Hz is supplied to the HDR photoelectric conversion unit 105. The HDR photoelectric conversion unit 105 applies the photoelectric conversion characteristic for the HDR image (HDR OETF curve) to the high-quality format image data Vh3, and obtains the high-quality format image data Vh3' for transmission. The high-quality format image data Vh3' is supplied to the encoding unit 106-3 of the video encoder 106.

The video encoder 106 performs the encoding process on the basic format image data Vb' and the high-quality format image data Vh1', Vh2', and Vh3' and generates the encoded image data Cb, Ch1, Ch2, and Ch3. In other words, the encoding unit 106-0 performs the predictive encoding process of H.264/AVC, H.265/HEVC, or the like on the basic format image data Vb' for transmission, and obtains the encoded image data Cb.

Further, the encoding unit 106-1 performs the predictive encoding process of H.264/AVC, H.265/HEVC, or the like on the high-quality format image data Vh1' for transmission, and obtains the encoded image data Ch1. Further, the encoding unit 106-2 performs the predictive encoding process of H.264/AVC, H.265/HEVC, or the like on the high-quality format image data Vh2' for transmission, and obtains the encoded image data Ch2. Further, the encoding unit 106-3 performs the predictive encoding process of H.264/

AVC, H.265/HEVC, or the like on the high-quality format image data Vh3' for transmission, and obtains the encoded image data Ch3.

The video encoder 106 inserts the identification information identifying a corresponding format into each of the encoded image data Cb, Ch1, Ch2, and Ch3. In other words, the video encoder 106 inserts the identification information identifying a format corresponding to the NAL unit (the encoded image data) into the field of "nuh_layer_id" of the header of the NAL unit.

The encoded image data Cb, Ch1, Ch2, and Ch3 obtained by the video encoder 106 is supplied to the system encoder 107. The system encoder 107 generates the video stream using the encoded image data Cb, Ch1, Ch2, and Ch3, and generates the transport stream TS by performing the PES packetization and the TS packetization.

Here, in the case of the two-stream configuration, the two video streams, that is, the basic video stream including the encoded image data Cb and the extended video stream including the encoded image data Ch1, Ch2, and Ch3 are generated. Further, in the case of the one-stream configuration, one video stream including the encoded image data Cb, Ch1, Ch2, and Ch3 is generated.

The system encoder 107 inserts the information defining the format of the encoded image data indicated by the identification information inserted into the encoded image data into the layer of the container (the transport stream)

Here, in the case of the two-stream configuration, the scalable extension descriptor is inserted into the video elementary stream loop corresponding to the extended video stream (including the encoded image data Ch1, Ch2, and Ch3) existing under the PMT. Further, in the case of the one-stream configuration, the scalable extension descriptor is inserted into the video elementary stream loop corresponding to the video stream (including the encoded image data Cb, Ch1, Ch2, and Ch3) existing under the PMT.

The transport stream TS generated by the system encoder 107 is transferred to the transmission unit 108. The transmission unit 108 includes the transport stream TS in the broadcast wave or the network packet, and transmits a resulting signal to the reception device 200.

"Configuration of Reception Device"

Figure 12:
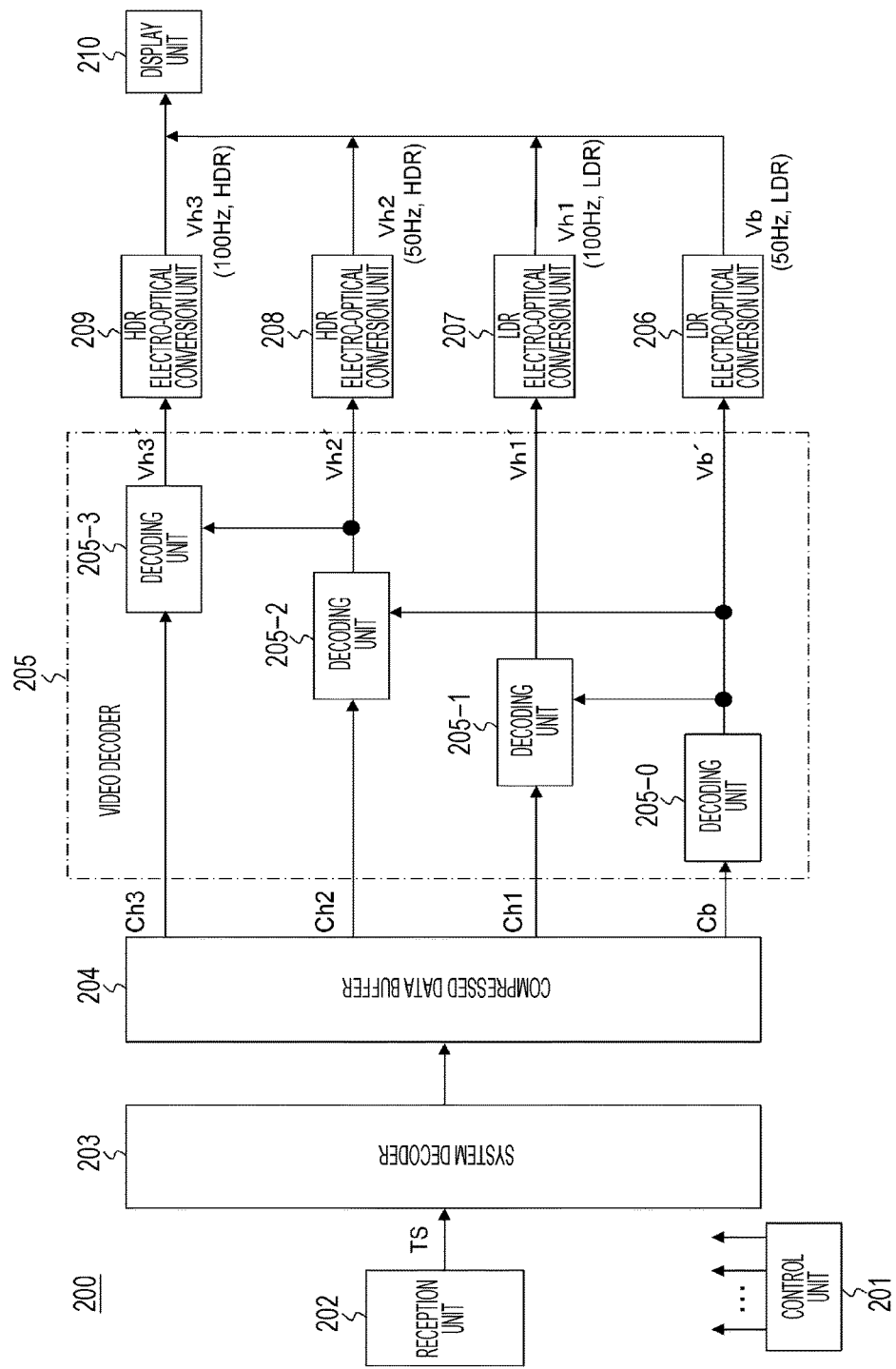
FIG. 12 is a block diagram illustrating an exemplary configuration of a reception device.

FIG. 12 illustrates an exemplary configuration of the reception device 200. The reception device 200 has an exemplary configuration corresponding to the exemplary configuration of the transmission device 100 of FIG. 2. The reception device 200 includes a control unit 201, a reception unit 202, a system decoder 203, a compressed data buffer (cpb) 204, a video decoder 205, LDR electro-optical conversion units 206 and 207, HDR electro-optical conversion units 208 and 209, and a display unit (display device) 210.

The control unit 201 is configured with a central processing unit (CPU) and controls operations of the respective units of the reception device 200 on the basis of a control program. The reception unit 202 receives the transport stream TS included in the broadcast wave or the network packet and transmitted from the transmission device 100. The system decoder 203 extracts the video stream from the transport stream TS.

In the case of the two-stream configuration (see FIG. 10), the two video streams, that is, the basic video stream including the encoded image data Cb of the basic format image data and the extended video stream including the encoded image data Ch1, Ch2, and Ch3 of the high-quality format image data are extracted. Further, in the case of the one-stream configuration (see FIG. 11), one video stream including the encoded image data Cb of the basic format image data and the encoded image data Ch1, Ch2, and Ch3 of the high-quality format image data is extracted.

Further, the system decoder 203 extracts various information inserted into the layer of the container (the transport stream), and transfers the extracted information to the control unit 201. The scalable extension descriptor is also included in this information. On the basis of this descriptor, the control unit 201 can detect the format of the encoded image data indicated by the identification information inserted into the encoded image data (in this embodiment, "nuh_layer_id" of the header of the NAL unit) in the layer of the container in advance.

The compressed data buffer 204 temporarily accumulates the video stream extracted by the system decoder 203. The video decoder 205 includes four decoding units 205-0, 205-1, 205-2, and 205-3. The decoding unit 205-0 performs the decoding process on the encoded image data Cb of the basic format (the basic component) selectively read from the compressed data buffer 204, and generates the basic format image data Vb'. In this case, the decoding unit 205-0 performs prediction and compensation within the image data Vb'.

The decoding unit 205-1 performs the decoding process on the encoded image data Ch1 of the frame rate extension (the frame rate extension component) selectively read from the compressed data buffer 204, and generates the high-quality format image data Vh1'. In this case, the decoding unit 205-1 performs prediction and compensation within the image data Vh1' or inter-prediction and compensation with the image data Vb' in units of encoding blocks in association with the prediction at the time of encoding.

The decoding unit 205-2 performs the decoding process on the encoded image data Ch2 of the dynamic range extension (the dynamic range extension component) selectively read from the compressed data buffer 204, and generates the high-quality format image data Vh2'. In this case, the decoding unit 205-2 performs prediction and compensation within the image data Vh2' or inter-prediction and compensation with the image data Vb' in units of encoding blocks in association with the prediction at the time of encoding.

The decoding unit 205-3 performs the decoding process on the encoded image data Ch3 of the frame rate extension and the dynamic range extension (the frame rate extension component and the dynamic range extension component) selectively read from the compressed data buffer 204, and generates the high-quality format image data Vh3'. In this case, the decoding unit 205-3 performs prediction and compensation within the image data Vh3' or inter-prediction and compensation with the image data Vh2' in units of encoding blocks in association with the prediction at the time of encoding.

Figure 13:
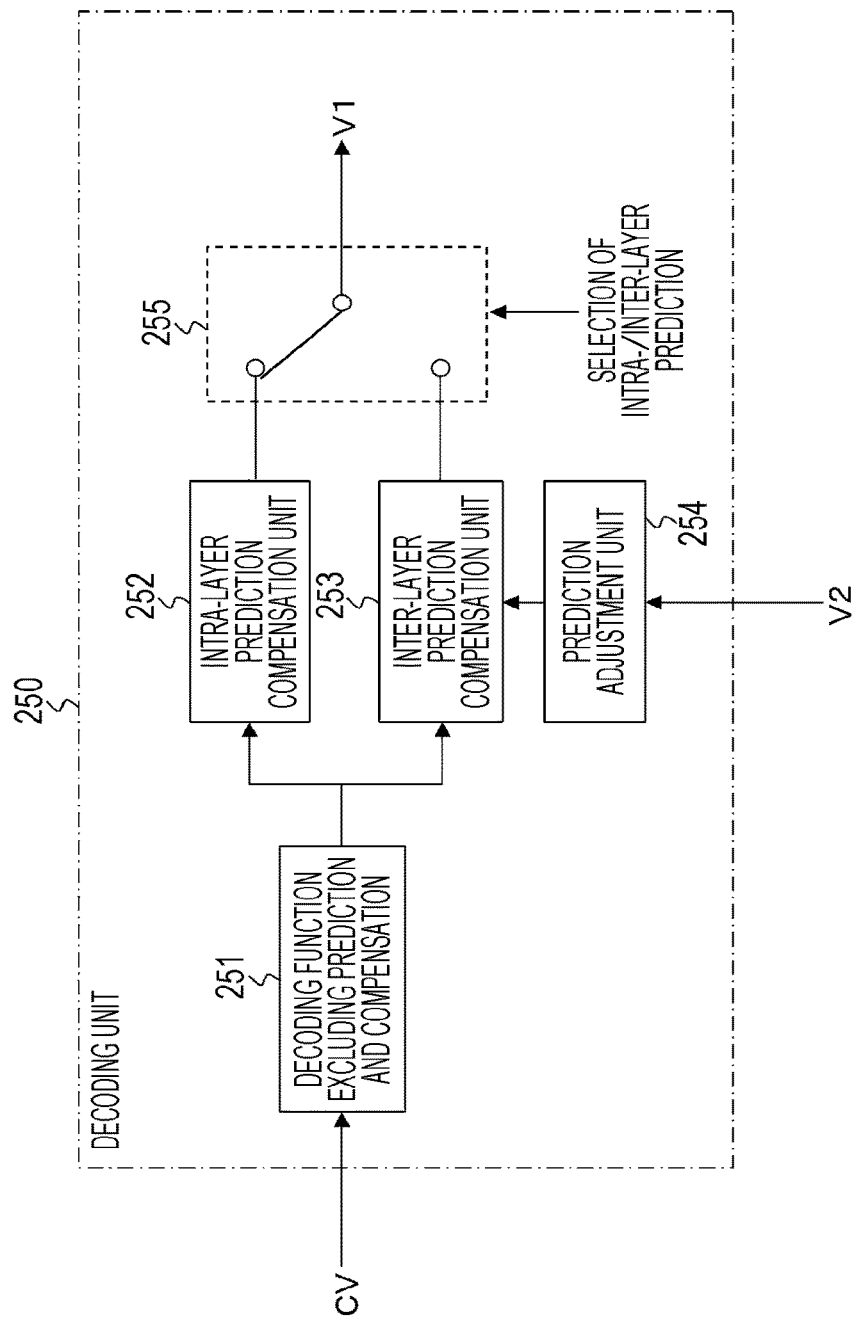
FIG. 13 is a block diagram illustrating an exemplary configuration of a main part of a decoding unit.

FIG. 13 illustrates an exemplary configuration of a main part of a decoding unit 250. The decoding unit 250 can be applied to the decoding units 205-1, 205-2, and 205-3. The decoding unit 250 performs a process opposite to the process of the encoding unit 165 of FIG. 4. The decoding unit 250 includes a decoding function unit 251, an intra-layer prediction compensation unit 252, an inter-layer prediction compensation unit 253, a prediction adjustment unit 254, and a selection unit 255.

The decoding function unit 251 performs the decoding process on the encoded image data CV rather than prediction and compensation, and obtains the predictive residual data. The intra-layer prediction compensation unit 252 performs the prediction and compensation within the image data V1 (the intra-layer prediction and compensation) on the predictive residual data, and obtains the image data V1. The inter-layer prediction compensation unit 253 performs the inter-prediction and compensation with the image data V2 to be referred to (the inter-layer prediction and compensation) on the predictive residual data, and obtains the image data V1.

Although a detailed description is omitted, the prediction adjustment unit 254 performs the process according to the scalable extension type of the image data V1 for the image data V2, similarly to the prediction adjustment unit 163 of the encoding unit 160 of FIG. 4. The selection unit 255 selectively extracts and outputs the image data V1 obtained by the intra-layer prediction compensation unit 252 or the image data V1 obtained by the inter-layer prediction compensation unit 253 in units of encoding blocks in association with the prediction at the time of encoding.

Referring back to FIG. 12, the LDR electro-optical conversion unit 206 performs electro-optical conversion of an opposite characteristic to the LDR photoelectric conversion unit 102 in the transmission device 100 on the basic format image data Vb' obtained by the decoding unit 205-0, and obtains the basic format image data Vb. The basic format image data is the LDR image data whose frame frequency is 50 Hz.

Further, LDR electro-optical conversion unit 207 performs electro-optical conversion of an opposite characteristic to the LDR photoelectric conversion unit 103 in the transmission device 100 on the high-quality format image data Vh1' obtained by the decoding unit 205-1, and obtains the high-quality format image data Vh1. The high-quality format image data Vh1 is the LDR image data whose frame frequency is 100 Hz.

Further, the HDR electro-optical conversion unit 208 performs electro-optical conversion of an opposite characteristic to the HDR photoelectric conversion unit 104 in the transmission device 100 on the high-quality format image data Vh2' obtained by the decoding unit 205-2, and obtains the high-quality format image data Vh2. The high-quality format image data Vh2 is the HDR image data whose frame frequency is 50 Hz.

Further, the HDR electro-optical conversion unit 209 performs electro-optical conversion of an opposite characteristic to the HDR photoelectric conversion unit 105 in the transmission device 100 on the high-quality format image data Vh3' obtained by the decoding unit 205-3, and obtains the high-quality format image data Vh3. The high-quality format image data Vh3 is the HDR image data whose frame frequency is 100 Hz.

The display unit 210 is configured with, for example, a liquid crystal display (LCD), an organic electro-luminescence (organic EL) panel, or the like. The display unit 210 displays an image according to any one of the basic format image data Vb and the high-quality format image data Vh1, Vh2, and Vh3 according to a display capability.

In this case, the control unit 201 controls image data to be supplied to the display unit 210. This control is performed on the basis of the identification information of the basic format and the high-quality format inserted into each encoded image data and display capability information of the display unit 209.

In other words, when the display unit 210 is unable to perform the display of the high frame frequency and the display of the high dynamic range, control is performed such that the basic format image data Vb related to decoding of the encoded image data Cb of the basic format (the basic component) is supplied to the display unit 210. In this case, the control unit 201 selectively extracts the encoded image data Cb of the basic format from the compressed data buffer 204, and transfers the encoded image data Cb of the basic format to the decoding unit 205-0. Then, the control unit 201 performs control such that the decoding unit 205-0 decodes the encoded image data Cb, and the LDR electro-optical conversion unit 206 outputs the basic format image data Vb.

Further, when the display unit 210 is able to perform the display of the high frame frequency but unable to perform the display of the high dynamic range, control is performed such that the high-quality format image data Vh1 related to decoding of the encoded image data Ch1 of the frame rate extension (the frame rate extension component) is supplied to the display unit 210.

In this case, the control unit 201 selectively extracts the encoded image data Cb of the basic format from the compressed data buffer 204 and transfers the encoded image data Cb of the basic format to the decoding unit 205-0, and selectively extracts the encoded image data Ch1 of the frame rate extension from the compressed data buffer 204 and transfers the encoded image data Ch1 of the frame rate extension to the decoding unit 205-1. Then, the control unit 201 performs control such that the decoding unit 205-0 decodes the encoded image data Cb, the decoding unit 205-1 decodes the encoded image data Ch1, and the LDR electro-optical conversion unit 207 outputs the high-quality format image data Vh1.

Further, when the display unit 210 is unable to perform the display of the high frame frequency but able to perform the display of the high dynamic range, control is performed such that the high-quality format image data Vh2 related to decoding of the encoded image data Ch2 of the dynamic range extension (the dynamic range extension component) is supplied to the display unit 210.

In this case, the control unit 201 selectively extracts the encoded image data Cb of the basic format from the compressed data buffer 204 and transfers the encoded image data Cb of the basic format to the decoding unit 205-0, and selectively extracts the encoded image data Ch2 of the dynamic range extension from the compressed data buffer 204 and transfers the encoded image data Ch2 of the dynamic range extension to the decoding unit 205-2. Then, the control unit 201 performs control such that the decoding unit 205-0 decodes the encoded image data Cb, the decoding unit 205-2 decodes the encoded image data Ch2, and the LDR electro-optical conversion unit 208 outputs the high-quality format image data Vh2.

Further, when the display unit 210 is able to perform the display of the high frame frequency and the display of the high dynamic range, control is performed such that the high-quality format image data Vh3 related to decoding of the encoded image data Ch3 of the frame rate extension and the dynamic range extension (the frame rate extension component and the dynamic range extension component) is supplied to the display unit 210.

In this case, the control unit 201 selectively extracts the encoded image data Cb of the basic format from the compressed data buffer 204 and transfers the encoded image data Cb of the basic format to the decoding unit 205-0, selectively extracts the encoded image data Ch2 of the dynamic range extension from the compressed data buffer 204 and transfers the encoded image data Ch2 of the dynamic range extension to the decoding unit 205-1, and selectively extracts the encoded image data Ch3 of the frame rate extension and the dynamic range extension from the compressed data buffer 204 and transfers the encoded image data Ch3 of the frame rate extension and the dynamic range extension to the decoding unit 205-3.

Then, the control unit 201 performs control such that the decoding unit 205-0 decodes the encoded image data Cb, the decoding unit 205-2 decodes the encoded image data Ch2, the decoding unit 205-3 decodes the encoded image data Ch3, and the HDR electro-optical conversion unit 209 outputs the high-quality format image data Vh3.

Figure 14:
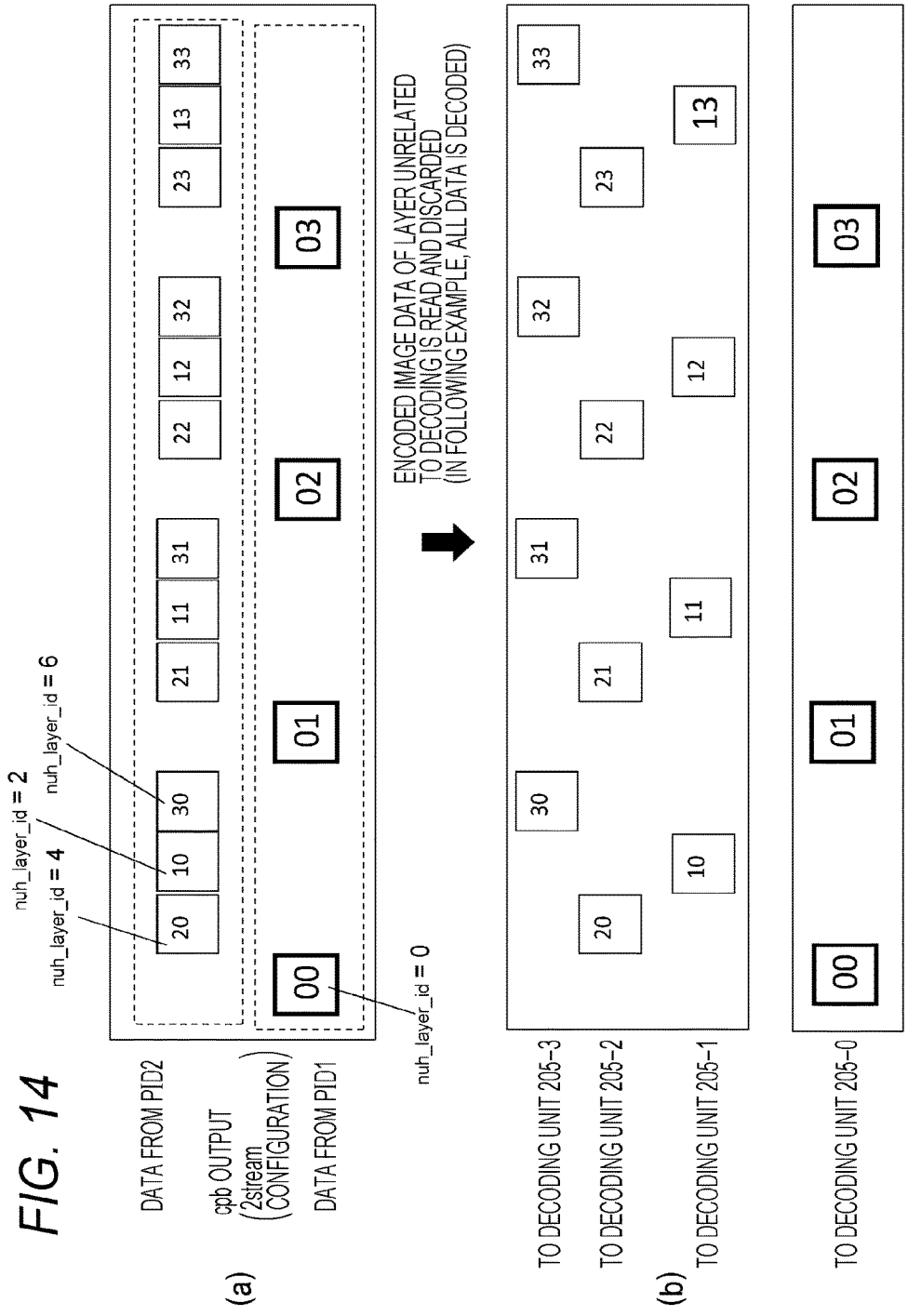
FIGS. 14(a) and 14(b) are diagrams schematically illustrating an output of a compressed data buffer (cpb) and distribution of encoded image data Cb, Ch1, Ch2, and Ch3 to corresponding decoding units according to "nuh_layer_id" in the case of a two-stream configuration.

FIGS. 14(*a*) and 14 (*b*) schematically illustrate an output of the compressed data buffer (cpb) 204 and distribution of the encoded image data Cb, Ch1, Ch2, and Ch3 to the corresponding decoding units according to "nuh_layer_id" in the case of the two-stream configuration.

In the case of the two-stream configuration, as illustrated in FIG. 14(*a*), the encoded image data Cb of the basic format included in the basic video stream (PID1) and the encoded image data of the pictures of the encoded image data Ch1, Ch2, and Ch3 of the high-quality format included in the extended video stream (PID2) are sequentially read from the compressed data buffer (cpb) 204.

Here, "00," "01," . . . indicate the encoded image data of the respective pictures constituting the encoded image data Cb, and "nuh_layer_id" of the header of the NAL unit is set to "0." The control unit 201 detects that "nuh_layer_id"="0" indicates the encoded image data of the basic format since the encoded image data Cb is included in the basic video stream.

Further, "10," "11," . . . indicate the encoded image data of the respective pictures constituting the encoded image data Ch1, and "nuh_layer_id" of the header of the NAL unit is set to "2." The control unit 201 detects that "nuh_layer_id"="2" indicates the encoded image data of the frame rate extension on the basis of a definition by the scalable extension descriptor.

Further, "20," "21," . . . indicate the encoded image data of the respective pictures constituting the encoded image data Ch2, and "nuh_layer_id" of the header of the NAL unit is set to "4." The control unit 201 detects that "nuh_layer_id"="4" indicates the encoded image data of the dynamic range extension on the basis of a definition by the scalable extension descriptor.

Further, "30," "31," . . . indicate the encoded image data of the respective pictures constituting the encoded image data Ch3, and "nuh_layer_id" of the header of the NAL unit is set to "6." The control unit 201 detects that "nuh_layer_id"="6" indicates the encoded image data of the frame rate extension and the dynamic range extension on the basis of a definition by the scalable extension descriptor.

The encoded image data of the respective pictures read from the compressed data buffer 204 is transferred to a corresponding to decoding unit on the basis of "nuh_layer_id" as illustrated in FIG. 14 (*b*). In this case, the encoded image data of a layer unrelated to decoding is read and discarded. The illustrated example is an example in which all data is decoded.

Figure 15:
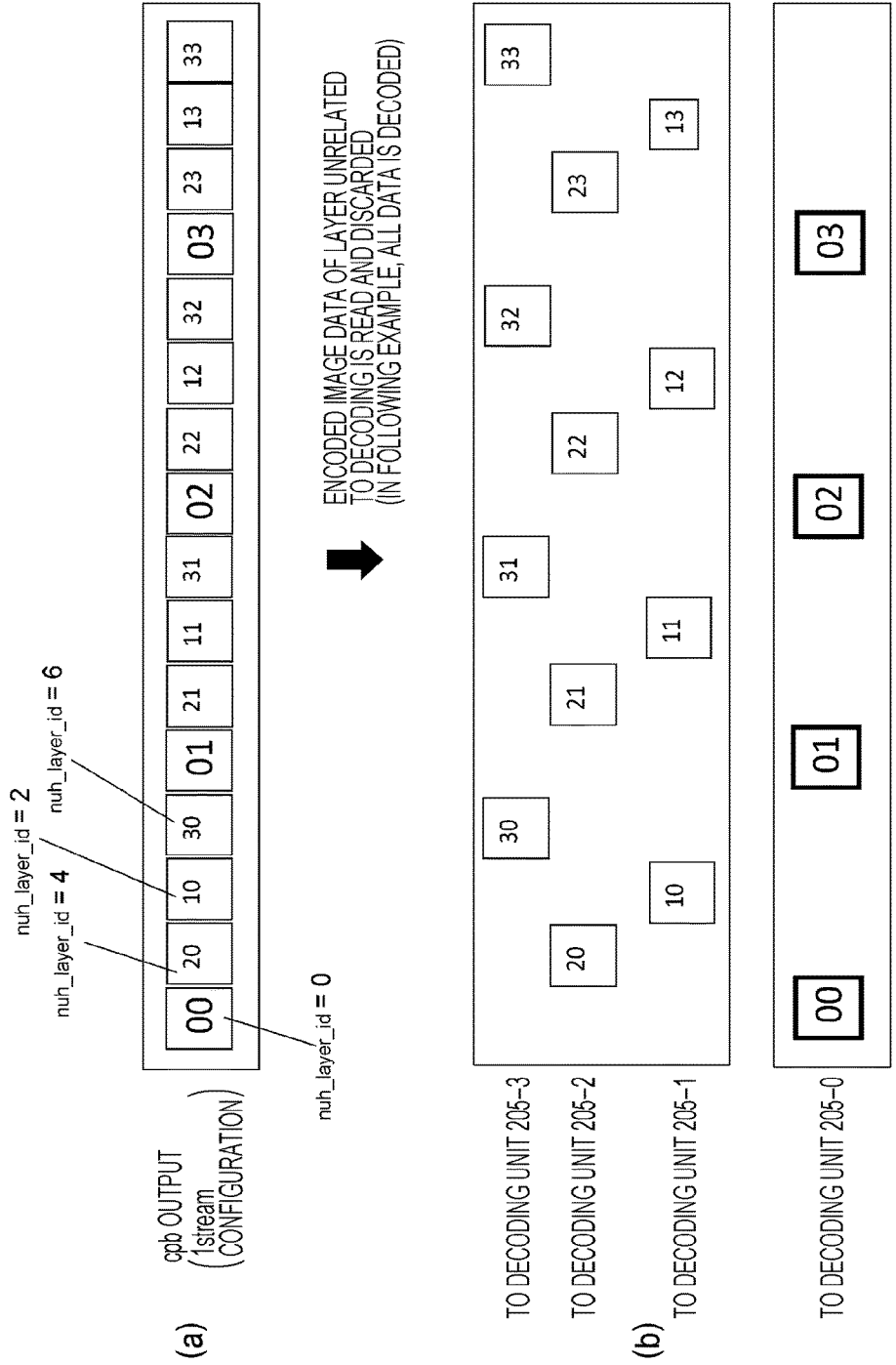
FIGS. 15(a) and 15(b) are diagrams schematically illustrating an output of a compressed data buffer (cpb) and distribution of encoded image data Cb, Ch1, Ch2, and Ch3 to corresponding decoding units according to "nuh_layer_id" in the case of one-stream configuration.

FIGS. 15(*a*) and 15(*b*) schematically illustrate an output of the compressed data buffer (cpb) 204 and distribution of the encoded image data Cb, Ch1, Ch2, and Ch3 to the corresponding decoding units according to "nuh_layer_id" in the case of the one-stream configuration.

In the case of the one-stream configuration, as illustrated in FIG. 15(*a*), the encoded image data Cb of the basic format included in one video stream (PID1) and the encoded image data of the pictures of the encoded image data Ch1, Ch2, and Ch3 of the high-quality format are sequentially read from the compressed data buffer (cpb) 204.

Here, "00," "01," . . . indicate the encoded image data of the respective pictures constituting the encoded image data Cb, and "nuh_layer_id" of the header of the NAL unit is set to "0." The control unit 201 detects that "nuh_layer_id"="0" indicates the encoded image data of the basic format on the basis of a definition by the scalable extension descriptor.

Further, "10," "11," . . . indicate the encoded image data of the respective pictures constituting the encoded image data Ch1, and "nuh_layer_id" of the header of the NAL unit is set to "2." The control unit 201 detects that "nuh_layer_id"="2" indicates the encoded image data of the frame rate extension on the basis of a definition by the scalable extension descriptor.

Further, "20," "21," . . . indicate the encoded image data of the respective pictures constituting the encoded image data Ch2, and "nuh_layer_id" of the header of the NAL unit is set to "4." The control unit 201 detects that "nuh_layer_id"="4" indicates the encoded image data of the dynamic range extension on the basis of a definition by the scalable extension descriptor.

Further, "30," "31," . . . indicate the encoded image data of the respective pictures constituting the encoded image data Ch3, and "nuh_layer_id" of the header of the NAL unit is set to "6." The control unit 201 detects that "nuh_layer_id"="6" indicates the encoded image data of the frame rate extension and the dynamic range extension on the basis of a definition by the scalable extension descriptor.

The encoded image data of the respective pictures read from the compressed data buffer 204 is transferred to a corresponding decoding unit on the basis of "nuh_layer_id" as illustrated in FIG. 15(*b*). In this case, the encoded image data of a lay unrelated to decoding is read and discarded. The illustrated example is an example in which all data is decoded.

Figure 16:
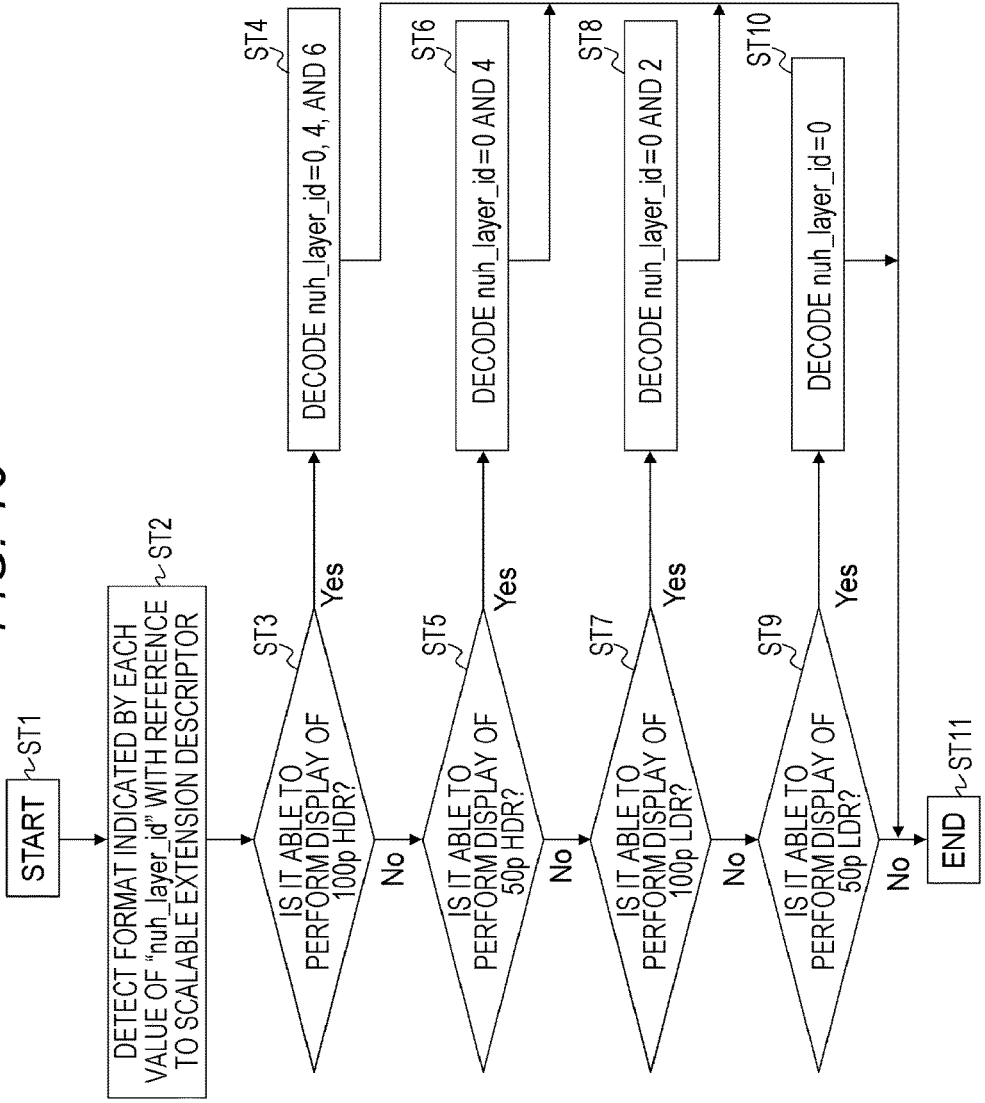
FIG. 16 is a flowchart illustrating an example of a process of determining a decoding range on the basis of display capability information (display performance information).

A flowchart of FIG. 16 illustrates an example of a process in which the control unit 201 determines a decoding range on the basis of display capability information (display performance information). In step ST1, the control unit 201 starts a process.

Then, in step ST2, the control unit 201 detects "nuh_layer_id" of each format with reference to the scalable extension descriptor. In this embodiment, "nuh_layer_id"="0" is detected in the basic format, "nuh_layer_id"="2" is detected in the frame rate extension, "nuh_layer_id"="4" is detected in the dynamic range rate extension, and "nuh_layer_id"="6" is detected in the frame rate extension and the dynamic range rate extension.

Then, in step ST3, the control unit 201 determines whether or not it is possible to perform display of 100p HDR, that is, display of the HDR whose frame frequency is 100 Hz. When it is possible to perform display of 100p HDR, that is, display of the HDR whose frame frequency is 100 Hz, in step ST4, the control unit 201 sets the encoded image data having "nuh_layer_id" of "0," "4," and "6," that is, the encoded image data Cb, Ch2, and Ch3 as the decoding range, and then, in step ST11, the control unit 201 ends the process.

When it is difficult to perform display of 100p HDR, that is, display of the HDR whose frame frequency is 100 Hz in step ST3, in step ST5, the control unit 201 determines whether or not it is possible to perform display of 50p HDR, that is, display of the HDR whose frame frequency is 50 Hz. When it is possible to perform display of 50p HDR, that is, display of the HDR whose frame frequency is 50 Hz, in step ST6, the control unit 201 sets the encoded image data having "nuh_layer_id" of "0" and "4," that is, the encoded image data Cb and Ch2 as the decoding range, and then, in step ST11, the control unit 201 ends the process.

When it is difficult to perform display of 50p HDR, that is, display of the HDR whose frame frequency is 50 Hz in step ST5, in step ST7, the control unit 201 determines whether or not it is possible to perform display of 100p LDR, that is, display of the LDR whose frame frequency is 100 Hz. When it is possible to perform display of 100p LDR, that is, display of the LDR whose frame frequency is 100 Hz, in step ST8, the control unit 201 sets the encoded image data having "nuh_layer_id" of "0" and "2," that is, the encoded image data Cb and Ch1 as the decoding range, and then, in step ST11, the control unit 201 ends the process.

When it is difficult to perform display of 100p LDR, that is, display of the LDR whose frame frequency is 100 Hz in step ST7, in step ST9, the control unit 201 determines whether or not it is possible to perform display of 50p LDR, that is, display of the LDR whose frame frequency is 50 Hz. When it is possible to perform display of 50p LDR, that is, display of the LDR whose frame frequency is 50 Hz, in step ST10, the control unit 201 sets the encoded image data having "nuh_layer_id" of "0," that is, the encoded image data Cb as the decoding range, and then, in step ST11, the control unit 201 ends the process. Note that, when it is difficult to perform display of 50p LDR, that is, display of the LDR whose frame frequency is 50 Hz in step ST9, in step ST11, the control unit 201 ends the process.

An operation of the reception device 200 illustrated in FIG. 12 will be briefly described. The reception unit 202 receives the transport stream TS included in the broadcast wave or the network packet and transmitted from the transmission device 100. The transport stream TS is supplied to the system decoder 203. The system decoder 203 extracts the video stream from the transport stream TS. The video stream is temporarily accumulated in the compressed data buffer 204.

Here, in the case of the two-stream configuration (see FIG. 10), the two video streams, that is, the basic video stream including the encoded image data Cb of the basic format image data and the extended video stream including the encoded image data Ch1, Ch2, and Ch3 of the high-quality format image data are extracted. Further, in the case of the one-stream configuration ((see FIG. 11), one video stream including the encoded image data Cb of the basic format image data and the encoded image data Ch1, Ch2, and Ch3 of the high-quality format image data is extracted.

Further, the system decoder 203 extracts various information inserted into the layer of the container (the transport stream), and transfers the extracted information to the control unit 201. The scalable extension descriptor is also included in this information. On the basis of this descriptor, the control unit 201 can detect the format of the encoded image data indicated by the identification information inserted into the encoded image data (in this embodiment, "nuh_layer_id" of the header of the NAL unit).

When the display unit 210 is unable to perform the display of the high frame frequency and the display of the high dynamic range, the basic format image data Vb is supplied from the LDR electro-optical conversion unit 206 to the display unit 210. The display unit 210 displays a 50p LDR image on the basis of the basic format image data Vb, that is, the LDR image data whose frame frequency is 50 Hz.

In this case, the encoded image data Cb of the basic format in which "nuh_layer_id" of the header of the NAL unit is "0" is selectively extracted from the compressed data buffer 204 and supplied to the decoding unit 205-0. The decoding unit 205-0 performs the decoding process on the encoded image data Cb, and generates the basic format image data Vb'. The basic format image data Vb' is supplied to the LDR electro-optical conversion unit 206. The LDR electro-optical conversion unit 206 performs the electro-optical conversion on the basic format image data Vb', obtains the basic format image data Vb, and supplies the basic format image data Vb to the display unit 210.

Further, when the display unit 210 is able to perform the display of the high frame frequency but unable to perform the display of the high dynamic range, the high-quality format image data Vh1 is supplied from the LDR electro-optical conversion unit 207 to the display unit 210. An image based on the high-quality format image data Vh1, that is, the LDR image data whose frame frequency is 100 Hz is displayed on the display unit 210.

In this case, the encoded image data Cb of the basic format in which "nuh_layer_id" of the header of the NAL unit is "0" is selectively extracted from the compressed data buffer 204 and supplied to the decoding unit 205-0. The decoding unit 205-0 performs the decoding process on the encoded image data Cb, and generates the basic format image data Vb'.

Further, the encoded image data Ch1 of the frame rate extension in which "nuh_layer_id" of the header of the NAL unit is "2" is selectively extracted from the compressed data buffer 204 and supplied to the decoding unit 205-1. The decoding unit 205-1 performs the decoding process on the encoded image data Ch1 with reference to the basic format image data Vb', and generates the high-quality format image data Vh1'.

The high-quality format image data Vh1' generated by the decoding unit 205-1 is supplied to the LDR electro-optical conversion unit 207. The LDR electro-optical conversion unit 207 performs the electro-optical conversion on the high-quality format image data Vh1', obtains the high-quality format image data Vh1, and supplies the high-quality format image data Vh1 to the display unit 210.

Further, when the display unit 210 is unable to perform the display of the high frame frequency but able to the display of the high dynamic range, the high-quality format image data Vh2 is supplied from the HDR electro-optical conversion unit 208 to the display unit 210. An image based on the high-quality format image data Vh2, that is, the HDR image data whose frame frequency is 50 Hz is displayed on the display unit 210.

In this case, the encoded image data Cb of the basic format in which "nuh_layer_id" of the header of the NAL unit is "0" is selectively extracted from the compressed data buffer 204 and supplied to the decoding unit 205-0. The decoding unit 205-0 performs the decoding process on the encoded image data Cb, and generates the basic format image data Vb'.

Further, the encoded image data Ch2 of the dynamic range extension in which "nuh_layer_id" of the header of the NAL unit is "4" is selectively extracted from the compressed data buffer 204 and supplied to the decoding unit 205-2. The decoding unit 205-2 performs the decoding process on the encoded image data Ch2 with reference to the basic format image data Vb', and generates the high-quality format image data Vh2'.

The high-quality format image data Vh2' generated by the decoding unit 205-2 is supplied to the HDR electro-optical conversion unit 208. The HDR electro-optical conversion unit 208 performs the electro-optical conversion on the high-quality format image data Vh2', obtains the high-quality format image data Vh2, and supplies the high-quality format image data Vh2 to the display unit 210.

Further, when the display unit 210 is able to perform both the display of the high frame frequency and the display of the high dynamic range, the high-quality format image data Vh3 is supplied from the HDR electro-optical conversion unit 209 to the display unit 210. An image based on the high-quality format image data Vh3, that is, the HDR image data whose frame frequency is 100 Hz is displayed on the display unit 210.

In this case, the encoded image data Cb of the basic format in which "nuh_layer_id" of the header of the NAL unit is "0" is selectively extracted from the compressed data buffer 204 and supplied to the decoding unit 205-0. The decoding unit 205-0 performs the decoding process on the encoded image data Cb, and generates the basic format image data Vb'.

Further, the encoded image data Ch2 of the dynamic range extension in which "nuh_layer_id" of the header of the NAL unit is "4" is selectively extracted from the compressed data buffer 204 and supplied to the decoding unit 205-2. The decoding unit 205-2 performs the decoding process on the encoded image data Ch2 with reference to the basic format image data Vb', and generates the high-quality format image data Vh2'.

Further, the encoded image data Ch3 of the frame rate extension and the dynamic range extension in which "nuh_layer_id" of the header of the NAL unit is "6" is selectively extracted from the compressed data buffer 204 and supplied to the decoding unit 205-3. The decoding unit 205-3 performs the decoding process on the encoded image data Ch2 with reference to the high-quality format image data Vh2', and generates the high-quality format image data Vh3'.

The high-quality format image data Vh3' generated by the decoding unit 205-3 is supplied to the HDR electro-optical conversion unit 209. The HDR electro-optical conversion unit 209 performs the electro-optical conversion on the high-quality format image data Vh3', obtains the high-quality format image data Vh3, and supplies the high-quality format image data Vh3 to the display unit 210.

As described above, in the transceiving system 10 illustrated in FIG. 1, the transmission device 100 inserts the identification information identifying a corresponding format into the encoded image data of the basic format image data and each of a predetermined number of pieces of the high-quality format image data. Thus, the reception side selectively performs the decoding process on predetermined encoded image data on the basis of the identification information and thus can easily obtain the image data according to the display capability.

Further, in the transceiving system 10 illustrated in FIG. 1, the transmission device 100 inserts the information defining the format of the encoded image data indicated by the identification information inserted into the encoded image data into the layer of the container. Thus, the reception side can detect the format of the encoded image data indicated by the identification information inserted into the encoded image data in the layer of the container in advance.

2. Modified Examples

Note that the above embodiment has been described in connection with the example in which the identification information is inserted into the encoded image data using the field of "nuh_layer_id" of the header of the NAL unit, but two fields of "nuh_layer_id" and "nuh_temporal_id_plus1" may be used.

Figure 17:
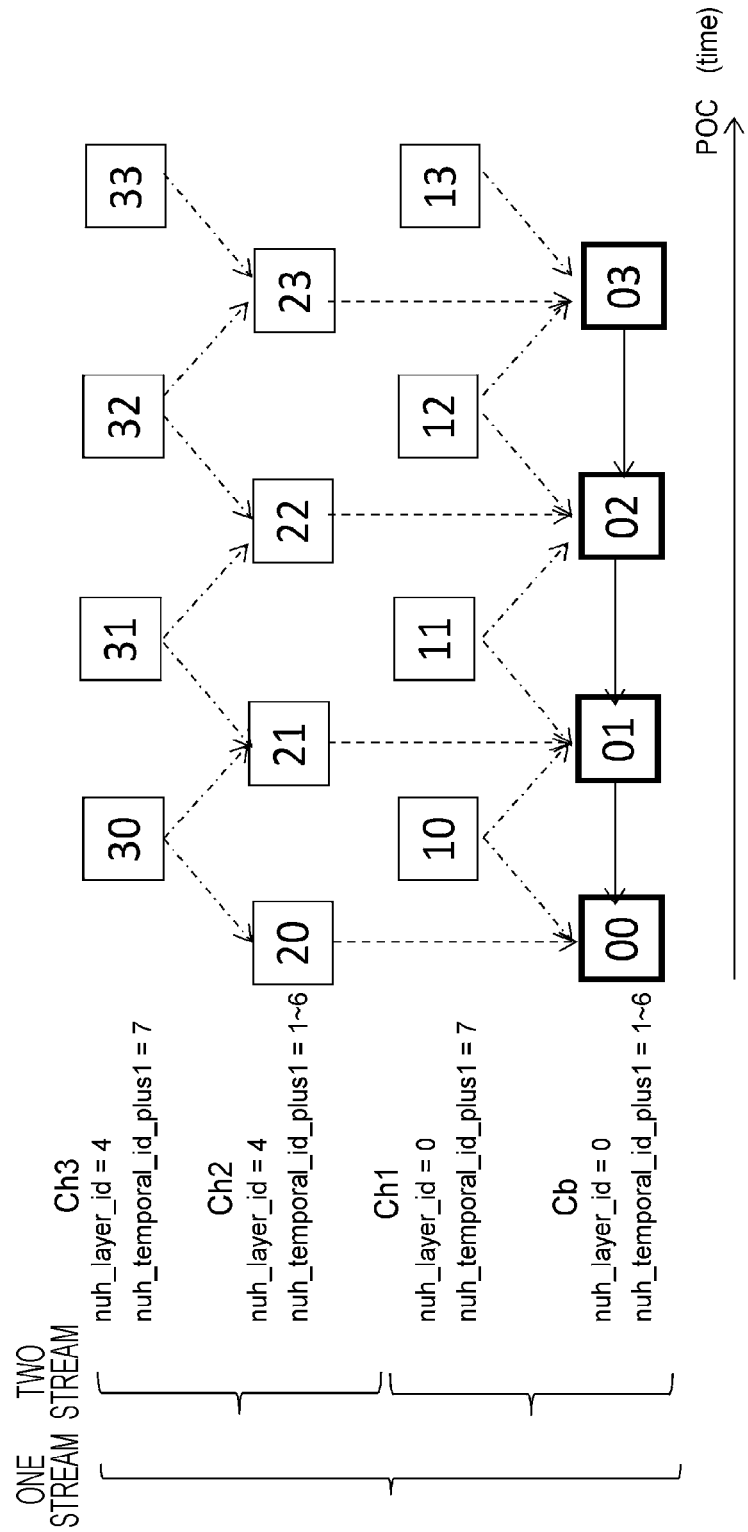
FIG. 17 is a diagram illustrating an exemplary configuration of encoded image data Cb, Ch1, Ch2, and Ch3.

For example, "nuh_layer_id" and "nuh_temporal_id_plus1" of the encoded image data Cb, Ch1, Ch2, and Ch3 are set, for example, as illustrated in FIG. 17. In other words, for the encoded image data Cb of the basic format, "nuh_layer_id" is set to "0," and "nuh_temporal_id_plus1" is set to "1 to 6." Further, for the encoded image data Ch1 of the frame rate extension, "nuh_layer_id" is set to "0," and "nuh_temporal_id_plus1" is set to "7."

Further, for the encoded image data Ch2 of the dynamic range extension, "nuh_layer_id" is set to "4," and "nuh_temporal_id_plus1" is set to "1 to 6." Further, for the encoded image data Ch3 of the frame rate extension and the dynamic range extension, "nuh_layer_id" is set to "4," and "nuh_temporal_id_plus1" is set to "7."

In this case, the scalable extension descriptor (see FIG. 7) is set as follows. In other words, in the case of the two-stream configuration, when the encoded data Ch2 and Ch3 is included in the extended video stream, "Extended_spatial_resolution_flag," "Extended_bit_depth_flag," and "Extended_color_gamut_flag" are set to "0," and "Extended_frame_rate_flag" and "Extended_dynamic_range_flag" are set to "1." Further, "number_of_layer IDs" is set to "3," and "4" and "4" are set in order as "layerID."

Through this setting, "nuh_layer_id"="0" and "nuh_temporal_id_plus1"="7" are defined to indicate the encoded image data of the frame rate extension. Further, "nuh_layer_id"="4" and "nuh_temporal_id_plus1"="1 to 6" are defined to indicate the encoded image data of the dynamic range extension. Further, "nuh_layer_id"="4" and "nuh_temporal_id_plus1"="7" are defined to indicate the encoded image data of the frame rate extension and the dynamic range extension.

Further, in the case of the one-stream configuration, when the encoded data Cb, Ch1, Ch2, and Ch3 is included in the extended video stream, "Extended_spatial_resolution_flag," "Extended_bit_depth_flag," and "Extended_color_gamut_flag" are set to "0," and "Extended_frame_rate_flag" and "Extended_dynamic_range_flag" are set to "1." Further, "number_of_layer IDs" is set to "4," and "0," "0," "4," and "4" are set in order as "layerID."

Through this setting, "nuh_layer_id"="0" and "nuh_temporal_id_plus1"="1 to 6" are defined to indicate the encoded image data of the basic format. Further, "nuh_layer_id"="0" and "nuh_temporal_id_plus1"="7" are defined to indicate the encoded image data of the frame rate extension. Further, "nuh_layer_id"="4" and "nuh_temporal_id_plus1"="1 to 6" are defined to indicate the encoded image data of the dynamic range extension. Further, "nuh_layer_id"="4" and "nuh_temporal_id_plus1"="7" are defined to indicate the encoded image data of the frame rate extension and the dynamic range extension.

FIG. 18 illustrates a correspondence relation between values of "nuh_layer_id" and "nuh_temporal_id_plus1" of the NAL unit header and description of the scalable extension descriptor. In other words, the encoded image data of the basic format (the basic component) of "nuh_layer_id"="0" and "nuh_temporal_id_plus1"="1 to 6" is included in the stream, "0" is set as "layerID." Further, the encoded image data of the frame rate extension (the frame rate extension component) of "nuh_layer_id"="0" and "nuh_temporal_id_plus1"="7" is included in the stream, "Extended_spatial_resolution_flag" is set to "1," and "0" is set as "layerID."

Further, the encoded image data of the dynamic range extension (the frame rate extension component) of "nuh_layer_id"="4" and "nuh_temporal_id_plus1"="1 to 6" is included in the stream, "Extended_dynamic_range_flag" is set to "1," and "4" is set as "layerID." Further, the encoded image data of the frame rate extension and the dynamic range extension (the frame rate extension component and the dynamic range extension component) of "nuh_layer_id"="4" and "nuh_temporal_id_plus1"="7" is included in the stream, "Extended_frame_rate_flag" and "Extended_dynamic_range_flag" are set to "1," and "4" is set as "layerID."

A flowchart of FIG. 19 illustrates an example of a process in which the control unit 201 determines the decoding range on the basis of the display capability information (display performance information) when two fields, that is, "nuh_layer_id" and "nuh_temporal_id_plus1" of the header of the NAL unit are used to insert the identification information into the encoded image data as described above.

In step ST21, the control unit 201 starts a process. Then, in step ST22, the control unit 201 detects "nuh_layer_id" and "nuh_temporal_id_plus1" of each format with reference to the scalable extension descriptor.

Here, "nuh_layer_id"="0" and "nuh_temporal_id_plus1"="1 to 6" are detected in the basic format, "nuh_layer_id"="0" and "nuh_temporal_id_plus1"="7" are detected in the frame rate extension, "nuh_layer_id"="4" and "nuh_temporal_id_plus1"="1 to 6" are detected in the dynamic range extension, and "nuh_layer_id"="4" and "nuh_temporal_id_plus1"="7" are detected in the frame rate extension and the dynamic range extension.

Then, in step ST23, the control unit 201 determines whether or not it is possible to perform display of 100p HDR, that is, display of the HDR whose frame frequency is 100 Hz. When it is possible to perform display of 100p HDR, that is, display of the HDR whose frame frequency is 100 Hz, in step ST24, the control unit 201 sets the encoded image data Cb of "nuh_layer_id"="0" and "nuh_temporal_id_plus1"="1 to 6" and the encoded image data Ch2 and Ch3 of "nuh_layer_id"="4" and "nuh_temporal_id_plus1"="1 to 7" as the decoding range, and then, in step ST31, the control unit 201 ends the process.

When it is difficult to perform display of 100p HDR, that is, display of the HDR whose frame frequency is 100 Hz in step ST23, in step ST25, the control unit 201 determines whether or not it is possible to perform display of 50p HDR, that is, display of the HDR whose frame frequency is 50 Hz. When it is possible to perform display of 50p HDR, that is, display of the HDR whose frame frequency is 50 Hz, in step ST26, the control unit 201 sets the encoded image data Cb of "nuh_layer_id"="0" and "nuh_temporal_id_plus1"="1 to 6" and the encoded image data Ch2 of "nuh_layer_id"="4" and "nuh_temporal_id_plus1"="1 to 6" as the decoding range, and then, in step ST31, the control unit 201 ends the process.

When it is difficult to perform display of 50p HDR, that is, display of the HDR whose frame frequency is 50 Hz in step ST25, in step ST27, the control unit 201 determines whether or not it is possible to perform display of 100p LDR, that is, display of the LDR whose frame frequency is 100 Hz. When it is possible to perform display of 100p LDR, that is, display of the LDR whose frame frequency is 100 Hz, in step ST28, the control unit 201 sets the encoded image data Cb and Ch1 of "nuh_layer_id"="0" and "nuh_temporal_id_plus1"="1 to 7" as the decoding range, and then, in step ST31, the control unit 201 ends the process.

When it is difficult to perform display of 100p LDR, that is, display of the LDR whose frame frequency is 100 Hz in step ST27, in step ST29, the control unit 201 determines whether or not it is possible to perform display of 50p LDR, that is, display of the LDR whose frame frequency is 50 Hz. When it is possible to perform display of 50p LDR, that is, display of the LDR whose frame frequency is 50 Hz, in step ST30, the control unit 201 sets the encoded image data Cb of "nuh_layer_id"="0" and "nuh_temporal_id_plus1"="1 to 6" as the decoding range, and then, in step ST31, the control unit 201 ends the process. Note that, when it is difficult to perform display of 50p LDR, that is, display of the LDR whose frame frequency is 50 Hz in step ST29, in step ST31, the control unit 201 ends the process.

Further, in the above embodiment, the transceiving system 10 including the transmission device 100 and the reception device 200 has been described, but a configuration of the transceiving system to which the present technology can be applied is not limited thereto. For example, a part of the reception device 200 may be a configuration such as a set top box and a monitor which are connected by a digital interface such as a high-definition multimedia interface (HDMI). In this case, the set top box can obtain the display capability information by acquiring extended display identification data (EDID) from the monitor, for example. Note that "HDMI" is a registered trademark.

Further, in the above embodiment, the example in which the container is the transport stream (MPEG-2 TS) has been described. However, the present technology can be similarly applied to a system having a configuration in which delivery to a reception terminal is performed using a network such as the Internet. In the Internet delivery, delivery is commonly performed using MP4 or any other format of container. In other words, containers of various formats such as a transport stream (MPEG-2 TS) employed in a digital broadcasting standard or MP4 used in the Internet delivery are used as the container.

Further, the present technology may have the following configurations.

(1) A transmission device, including:

an image encoding unit that generates a basic video stream including encoded image data of basic format image data and an extended video stream including encoded image data of each of a predetermined number of pieces of high-quality format image data; and a transmission unit that transmits a container of a predetermined format including the basic video stream and the extended video stream generated by the image encoding unit, wherein the image encoding unit inserts identification information identifying a corresponding format into the encoded image data of the basic format image data and each of the predetermined number of pieces of high-quality format image data.

(2) The transmission device according to (1), wherein the encoded image data has a NAL unit structure, and the image encoding unit inserts the identification information into a header of the NAL unit.

(3) The transmission device according to (2), wherein the image encoding unit inserts the identification information using a field of "nuh_layer_id" of the header of the NAL unit.

(4) The transmission device according to (2), wherein the image encoding unit inserts the identification information using fields of "nuh_layer_id" and "nuh_temporal_id_plus1" of the header of the NAL unit.

(5) The transmission device according to any of (1) to (4), further including an information inserting unit that inserts information defining a format of the encoded image data indicated by the identification information inserted into the encoded image data into a layer of the container.

(6) The transmission device according to (5), wherein the container is an MPEG2-TS, and the information inserting unit inserts the information into a video elementary stream loop corresponding to the video stream existing under a program map table.

(7) A transmission method, including:
an image encoding step of generating a basic video stream including encoded image data of basic format image data and an extended video stream including encoded image data of each of a predetermined number of pieces of high-quality format image data; and
a transmission step of transmitting, by a transmission unit, a container of a predetermined format including the basic video stream and the extended video stream generated in the image encoding step,
wherein the image encoding step including inserting identification information identifying a corresponding format into the encoded image data of the basic format image data and each of the predetermined number of pieces of high-quality format image data.

(8) A reception device, including:
a reception unit that receives a container of a predetermined format including a basic video stream including encoded image data of basic format image data and an extended video stream including encoded image data of each of a predetermined number of pieces of high-quality format image data,
wherein identification information identifying a corresponding format is inserted into the encoded image data of the basic format image data and each of the predetermined number of pieces of high-quality format image data; and
a processing unit that processes the video streams included in the received container on the basis of the identification information and display capability information.

(9) The reception device according to (8),
wherein the encoded image data has a NAL unit structure, and
the identification information is inserted into a header of the NAL unit.

(10) The reception device according to (8) or (9),
wherein information defining a format of the encoded image data indicated by the identification information inserted into the encoded image data is inserted into a layer of the container, and
the processing unit detects a format of the encoded image data indicated by the identification information inserted into the encoded image data on the basis of the information inserted into the layer of the container.

(11) A transmission device, including:
an image encoding unit that generates a video stream including encoded image data of basic format image data and encoded image data of each of a predetermined number of pieces of high-quality format image data; and
a transmission unit that transmits a container of a predetermined format including the video stream generated by the image encoding unit,
wherein the image encoding unit inserts identification information identifying a corresponding format into the encoded image data of the basic format image data and each of the predetermined number of pieces of high-quality format image data.

(12) The transmission device according to (11),
wherein the encoded image data has a NAL unit structure, and
the image encoding unit inserts the identification information into a header of the NAL unit.

(13) The transmission device according to (12),
wherein the image encoding unit inserts the identification information using a field of "nuh_layer_id" of the header of the NAL unit.

(14) The transmission device according to (12),
wherein the image encoding unit inserts the identification information using fields of "nuh_layer_id" and "nuh_temporal_id_plus1" of the header of the NAL unit.

(15) The transmission device according to (11) to (14), further including
an information inserting unit that inserts information defining a format of the encoded image data indicated by the identification information inserted into the encoded image data into a layer of the container.

(16) The transmission device according to (15),
wherein the container is an MPEG2-TS, and
the information inserting unit inserts the information into a video elementary stream loop corresponding to the video stream existing under a program map table.

(17) A transmission method, including:
an image encoding step of generating a video stream including encoded image data of basic format image data and encoded image data of each of a predetermined number of pieces of high-quality format image data; and
a transmission step of transmitting, by a transmission unit, a container of a predetermined format including the video stream generated in the image encoding step,
wherein the image encoding step includes inserting identification information identifying a corresponding format into the encoded image data of the basic format image data and each of the predetermined number of pieces of high-quality format image data.

(18) A reception device, including:
a reception unit that receives a container of a predetermined format including a video stream including encoded image data of basic format image data and encoded image data of each of a predetermined number of pieces of high-quality format image data,
wherein identification information identifying a corresponding format is inserted into the encoded image data of the basic format image data and each of the predetermined number of pieces of high-quality format image data; and
a processing unit that processes the video stream included in the received container on the basis of the identification information and display capability information.

(19) The reception device according to (18),
wherein the encoded image data has a NAL unit structure, and
the identification information is inserted into a header of the NAL unit.

(20) The reception device according to (18) or (19),
wherein information defining a format of the encoded image data indicated by the identification information inserted into the encoded image data is inserted into a layer of the container, and
the processing unit detects a format of the encoded image data indicated by the identification information inserted into the encoded image data on the basis of the information inserted into the layer of the container.

One of main features of the present technology lies in that the identification information identifying a corresponding format is inserted into the encoded image data of the basic format image data and each of a predetermined number of pieces of the high-quality format image data, and resulting data is transmitted, and thus the reception side can easily obtain the image data according to the display capability by selectively performing the decoding process on predetermined encoded image data (See FIG. 10 and FIG. 11).

REFERENCE SIGNS LIST

10 Transceiving system
100 Transmission device
101 Control unit
102, 103 LDR photoelectric conversion unit
104, 105 HDR photoelectric conversion unit
106 Video encoder
106-0, 106-1, 106-2, 106-3 Encoding unit
107 System encoder
108 Transmission unit
150 Image data generating unit
151 HDR camera
152, 154 Frame rate conversion unit
153 Dynamic range conversion unit
160 Encoding unit
161 Intra-layer prediction unit
162 Inter-layer prediction unit
163 Prediction adjustment unit
164 Selection unit
165 Encoding function unit
200 Reception device
201 Control unit
202 Reception unit
203 System decoder
204 Compressed data buffer
205 Video decoder
205-0, 205-1, 205-2, 205-3 Decoding unit
206, 207 LDR electro-optical conversion unit
208, 209 HDR electro-optical conversion unit
210 Display unit
250 Decoding unit
251 Decoding function unit
252 Intra-layer prediction compensation unit
253 Inter-layer prediction compensation unit
254 Prediction adjustment unit
255 Selection unit

The invention claimed is:

1. A transmission device, comprising:
an image encoding circuit that generates a basic video stream including encoded image data of basic format image data and an extended video stream including encoded image data of each of a predetermined number of pieces of high-quality format image data; and
a transmitter that transmits a container of a predetermined format including the basic video stream and the extended video stream, wherein
the image encoding circuit inserts identification information into a header of the encoded image data of the basic format image data and a header of the encoded image data of each of the predetermined number of pieces of high-quality format image data,
the identification information in the header of the encoded image data of the basic format image data indicates a basic format, and
the identification information in the header of the encoded imaged data of each of the predetermined number of pieces of high-quality format image data indicates one of a plurality of different high-quality formats, wherein the identification information in the header of the encoded imaged data of each of the predetermined number of pieces of high-quality format image data indicates which of a plurality of different extension components are included in the container.

2. The transmission device according to claim 1, wherein the encoded image data of the basic format image data and the encoded image data of each of the predetermined number of pieces of high-quality format image data have a network abstraction layer (NAL) unit structure.

3. The transmission device according to claim 2, wherein the image encoding circuit inserts the identification information using a field of "nuh_layer_id".

4. The transmission device according to claim 2, wherein the image encoding circuit inserts the identification information using fields of "nuh_layer_id" and "nuh_temporal_id_plus1".

5. The transmission device according to claim 1, further comprising an information inserting circuit that inserts information into a layer of the container, the information corresponding to the identification information inserted into the header of the encoded image data of the basic format image data and the identification information inserted into the header of the encoded image data of each of the predetermined number of pieces of high-quality format image data.

6. The transmission device according to claim 5, wherein the container is an MPEG2-TS, and
the information inserting circuit inserts the information into a video elementary stream loop under a program map table.

7. The transmission device according to claim 1, wherein the identification information in the header of the encoded imaged data of each of the predetermined number of pieces of high-quality format image data indicates which two of the plurality of different extension components are included in the container.

8. The transmission device according to claim 1, wherein the identification information in the header of the encoded imaged data of each of the predetermined number of pieces of high-quality format image data indicates at least one of a spatial extension component, a frame rate extension component, a length extension component, a dynamic range extension component, and a color gamut extension component.

9. The transmission device according to claim 8, wherein the identification information in the header of the encoded imaged data of each of the predetermined number of pieces of high-quality format image data indicates at least two of the spatial extension component, the frame rate extension component, the length extension component, the dynamic range extension component, and the color gamut extension component.

10. The transmission device according to claim 1, wherein the one of the plurality of different high-quality formats is one of at least two different high-quality data formats.

11. The transmission device according to claim 1, wherein the one of the plurality of different high-quality formats is one of at least five different high-quality data formats.

12. The transmission device according to claim 1, wherein the one of the plurality of different high-quality formats is one of at least seven different high-quality data formats.

13. A transmission method, comprising: generating a basic video stream including encoded image data of basic format image data and an extended video stream including encoded image data of each of a predetermined number of pieces of high-quality format image data; and transmitting, by a transmission circuit, a container of a predetermined format including the basic video stream and the extended video stream, wherein the generating includes inserting identification information into a header of the encoded image data of the basic format image data and a header of the encoded image data of each of the predetermined number of pieces of high-quality format image data, the identification information in the header of the encoded image data of the basic format image data indicates a basic format, and the identification information in the header of the encoded image data of each of the predetermined number of pieces of high-quality format image data indicates one of a plurality of different high-quality formats, wherein the identification information in the header of the encoded imaged data of each of the predetermined number of pieces of high-quality format image data indicates which of a plurality of different extension components are included in the container.

14. A reception device, comprising: a receiver that receives a container of a predetermined format including a basic video stream including encoded image data of basic format image data and an extended video stream including encoded image data of each of a predetermined number of pieces of high-quality format image data, wherein identification information is inserted into a header of the encoded image data of the basic format image data and a header of the encoded image data of each of the predetermined number of pieces of high-quality format image data, the identification information in the header of the encoded image data of the basic format image data indicates a basic format, and the identification information in the header of the encoded imaged data of each of the predetermined number of pieces of high-quality format image data indicates one of a plurality of different high-quality formats; and a processing circuit that processes the video streams included in the received container on the basis of the identification information and display capability information, wherein the identification information in the header of the encoded imaged data of each of the predetermined number of pieces of high-quality format image data indicates which of a plurality of different extension components are included in the container.

15. The reception device according to claim 14, wherein the encoded image data of the basic format image data and the encoded image data of each of the predetermined number of pieces of high-quality format image data have a network abstraction layer (NAL) unit structure.

16. The reception device according to claim 14, wherein information is inserted into a layer of the container, the information corresponding to the identification information inserted into the header of the encoded image data of the basic format image data and the identification information inserted into the header the encoded image data of each of the predetermined number of pieces of high-quality format image data, and the processing circuit detects a format of the encoded image data on the basis of the information inserted into the layer of the container.

17. A reception device, comprising: a receiver that receives a container of a predetermined format including a video stream including encoded image data of basic format image data and encoded image data of each of a predetermined number of pieces of high-quality format image data, wherein identification information is inserted into a header of the encoded image data of the basic format image data and a header of the encoded image data of each of the predetermined number of pieces of high-quality format image data, the identification information in the header of the encoded image data of the basic format image data indicates a basic format, and the identification information in the header of the encoded imaged data of each of the predetermined number of pieces of high-quality format image data indicates one of a plurality of different high-quality formats: and a processing circuit that processes the video stream included in the received container on the basis of the identification information and display capability information.

18. The reception device according to claim 17, wherein the encoded image data of the basic format image data and the encoded image data of each of the predetermined number of pieces of high-quality format image data have a network abstraction layer (NAL) unit structure.

19. The reception device according to claim 17, wherein information is inserted into a layer of the container, the information corresponding to the identification information inserted into the header of the encoded image data of the basic format image data and the identification information inserted into the header the encoded image data of each of the predetermined number of pieces of high-quality format image data, and the processing circuit detects a format of the encoded image data on the basis of the information inserted into the layer of the container.

* * * * *